United States Patent
Weiss et al.

(10) Patent No.: US 12,509,714 B2
(45) Date of Patent: Dec. 30, 2025

(54) MULTIPLE HETERORESISTANCE TO GUIDE COMBINATION ANTIBIOTIC REGIMENS

(71) Applicant: Emory University, Atlanta, GA (US)

(72) Inventors: David Weiss, Decatur, GA (US); Victor Band, Decatur, GA (US); David Hufnagel, Atlanta, GA (US)

(73) Assignee: Emory University, Atlanta, GA (US)

( * ) Notice: Subject to any disclaimer, the term of this patent is extended or adjusted under 35 U.S.C. 154(b) by 1094 days.

(21) Appl. No.: 17/277,857

(22) PCT Filed: Sep. 23, 2019

(86) PCT No.: PCT/US2019/052338
§ 371 (c)(1),
(2) Date: Mar. 19, 2021

(87) PCT Pub. No.: WO2020/061553
PCT Pub. Date: Mar. 26, 2020

(65) Prior Publication Data
US 2021/0348207 A1 Nov. 11, 2021

Related U.S. Application Data

(60) Provisional application No. 62/734,526, filed on Sep. 21, 2018.

(51) Int. Cl.
*C12Q 1/20* (2006.01)
*A61K 45/06* (2006.01)

(52) U.S. Cl.
CPC ............... *C12Q 1/20* (2013.01); *A61K 45/06* (2013.01)

(58) Field of Classification Search
CPC ............ A61P 31/04; A61K 45/06; C12Q 1/20
See application file for complete search history.

(56) References Cited

U.S. PATENT DOCUMENTS

| | | | |
|---|---|---|---|
| 8,440,424 | B2 | 5/2013 | Thrippleton |
| 2014/0278136 | A1 | 9/2014 | Shamsheyeva |
| 2015/0148315 | A1 | 5/2015 | Ambrose |
| 2016/0243172 | A1 | 8/2016 | Cook |
| 2021/0215696 | A1 | 7/2021 | Weiss |

FOREIGN PATENT DOCUMENTS

| | | | | |
|---|---|---|---|---|
| WO | 2016085632 | | 6/2016 | |
| WO | WO-2016085632 A2 * | | 6/2016 | ........ B01L 3/502715 |

OTHER PUBLICATIONS

Cervera et al., (Clinical Microbio and Infection. May 24, 2014; vol. 20 (suppl. 7):49-73). (Year: 2014).*

(Continued)

Primary Examiner — Jana A Hines
(74) Attorney, Agent, or Firm — Emory Patent Group

(57) ABSTRACT

This disclosure contemplates detecting antimicrobial heteroresistance to guide antibiotic or other antimicrobial therapy. In certain embodiments, this disclosure contemplates avoiding a monotherapy with antibiotics to which an individual bacterial pie isolate is heteroresistant, because this can lead to treatment failure. Thus, in certain embodiments, one uses a combination of antibiotics to which a bacterium is individually heteroresistant.

7 Claims, 9 Drawing Sheets
Specification includes a Sequence Listing.

(56) References Cited

OTHER PUBLICATIONS

Paul, Combination therapy for carbapenem-resistant gram-negative bacteria. J Antimicrob Chemother 2014, 69, 2305-2309.

Chen et al. Notes fro the Field: Pan-Resistant New Delhi Matallo-Beta-Lactamase-Producing Klebsiella pneumoniae—Washoe County, Nevada, 2016, CDC, 2017, Morbidity and Mortality Weekly Report.

Tamma et al. Combination Therapy for Treatment of Infections with Gram-Negative Bacteria, Clinical Microbiology Reviews, 2012, vol. 25, No. 3, 450-470.

Aritaka et al. Combination Effect of Vancomycin and b-Lactams against a *Staphylococcus aureus* Strain, Mu3, with Heterogeneous Resistance to Vancomycin, Antimicrobial Agents and Chemotherapy, 2001, p. 1292-1294.

Band et al. Antibiotic failure mediated by a resistant subpopulation in Enterobacter cloacae, Nat. Microbiol. 1, 16053 (2016).

Band et al. Antibiotic combinations that exploit heteroresistance to multiple drugs effectively control infection, Nat Microbiol, 2019, 4(10):1627-1635.

Doern et al., When Does 2 Plus 2 Equal 5? A Review of Antimicrobial Synergy Testing, J Clin Microbiol 2014, 52, 4124-4128.

El-Halfawy et al. Antimicrobial Heteroresistance: an Emerging Field in Need of Clarity, Clin Microbiol Rev, 2015, 28:191-207.

Morrill et al. Treatment Options for Carbapenem-Resistant Enterobacteriaceae Infections, Open Forum Infectious Diseases, Infectious Diseases Society of America, 2015, 1-15.

Napier et al. Colistin Heteroresistance in Enterobacter cloacae Is Associated with Cross-Resistance to the Host Antimicrobial Lysozyme, Antimicrob Agents Chemother, 2014, 58(9): 5594-5597.

Odds et al., Synergy, antagonism, and what the chequerboard puts between them, J Antimicrob Chemother 2003, 52, 1.

Paul, Combination therapy for carbapenem-resistant gram-negative bacteria. J Antimicrob Chemother 2014, 69, 9 2305-2309.

\* cited by examiner

| Antibiotic And Class | Heteroresistance Rate (%) |
|---|---|
| Aminoglycosides | |
| Amikacin | 30.8% |
| Gentamicin | 13.5% |
| Tobramycin | 37.5% |
| Beta Lactams | |
| Ampicillin | 1.0% |
| Aztreonam | 11.5% |
| Cefazolin | 2.9% |
| Cefepime | |
| Ceftazidime | 11.5% |
| Meropenem | |
| Pip/Tazo | 30.8% |
| Other Classes | |
| Ciprofloxacin | 3.8% |
| Colistin | 14.4% |
| Fosfomycin | |
| Tetracycline | 11.5% |
| Tigecycline | 5.8% |
| Trimeth/Sulfa | 7.7% |
FIG. 2A
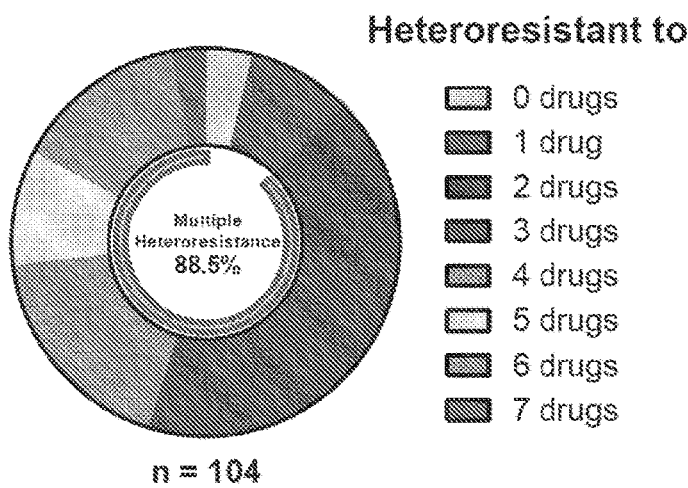
FIG. 2B
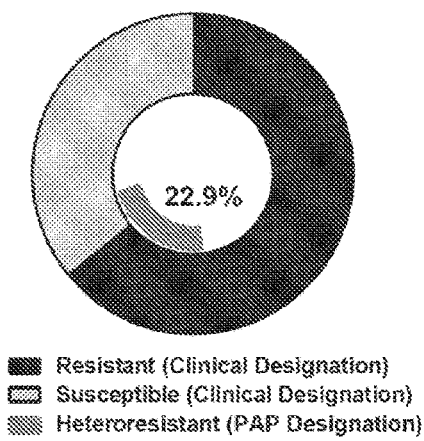
FIG. 2C
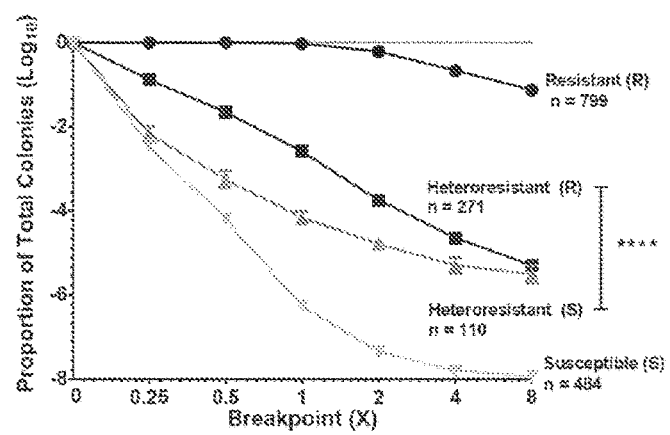
FIG. 2D

MULTIPLE HETERORESISTANCE TO GUIDE COMBINATION ANTIBIOTIC REGIMENS

CROSS-REFERENCE TO RELATED APPLICATIONS

This application is the National Stage of International Application No. PCT/US2019/052338 filed Sep. 23, 2019, which claims the benefit of U.S. Provisional Application No. 62/734,526 filed Sep. 21, 2018. The entirety of each of these applications is hereby incorporated by reference for all purposes.

STATEMENT REGARDING FEDERALLY SPONSORED RESEARCH OR DEVELOPMENT

This invention was made with government support under AI141883 awarded by the National Institutes of Health. The government has certain rights in the invention.

INCORPORATION-BY-REFERENCE OF MATERIAL SUBMITTED AS A TEXT FILE VIA THE OFFICE ELECTRONIC FILING SYSTEM (EFS-WEB)

The Sequence Listing associated with this application is provided in text format in lieu of a paper copy and is hereby incorporated by reference into the specification. The name of the text file containing the Sequence Listing is 18070PCT_ST25.txt. The text file is 1 KB, was created on Sep. 20, 2019, and is being submitted electronically via EFS-Web.

BACKGROUND

Antibiotic resistance is a major threat to worldwide public health. Multi-drug resistant bacteria have increasingly emerged as a cause of hospital-acquired infections. Polymyxin antibiotics, including colistin and polymyxin B, are increasingly relied on as a last line of treatment for highly antibiotic resistant Gram-negative infections. However, polymyxin-resistant bacterial isolates have also emerged. Further complicating the treatment of some bacterial infections is the unexplained failure of antibiotic therapy against bacterial strains that are classified as susceptible to the antibiotic. Thus, there is a need to generate improved diagnostics for identifying and treating antibiotic-resistant strains.

Odds et al., reports chequerboard assays. J Antimicrob Chemother 2003, 52, 1. Doern et al. reports antimicrobial synergy testing. J Clin Microbiol 2014, 52, 4124-4128. Paul report combination therapy for carbapenem-resistant gram-negative bacteria. J Antimicrob Chemother 2014, 69, 2305-2309. Band et al. report antibiotic failure mediated by a resistant subpopulation in *Enterobacter cloacae*. Nat. Microbiol. 1, 16053 (2016). Published US Patent Application number 2016/0243172 reports a medium to cultivate bacteria.

References cited herein are not an admission of prior art.

SUMMARY

This disclosure contemplates detecting antimicrobial heteroresistance to guide antibiotic or other antimicrobial therapy. In certain embodiments, this disclosure contemplates avoiding a monotherapy with antibiotics to which an individual bacterial isolate is heteroresistant, because this can lead to treatment failure. Thus, in certain embodiments, one uses a combination of antibiotics to which a bacterium is individually heteroresistant.

In certain embodiments, this disclosure contemplates methods of diagnosing and treating a bacterial infection comprising: obtaining a sample from a subject at risk of, exhibiting symptoms of, or diagnosed with a bacterial infection and administering to the subject an effective amount of a combination of antibiotics for treatment, wherein each antibiotic in the combination of antibiotics for treatment is determined to be heteroresistant.

In certain embodiments, this disclosure contemplates methods of diagnosing and treating a bacterial infection comprising: obtaining a sample from a subject at risk of, exhibiting symptoms of, or diagnosed with a bacterial infection; growing bacteria in the sample providing a purified bacterial culture; contacting the bacterial culture with a library of antibiotic agents; determining whether the bacterial culture for each antibiotic in the library is either, i) resistant, ii) heteroresistant, or iii) susceptible; and administering to the subject an effective amount of a combination of antibiotics for treatment, wherein each antibiotic in the combination of antibiotics for treatment is determined by the bacterial culture to be heteroresistant in the library.

In certain embodiments, this disclosure contemplates methods of diagnosing a subject as susceptible to a combination therapy comprising: obtaining a sample from a subject at risk of, exhibiting symptoms of, or diagnosed with a bacterial infection; determining that two antibiotics in the library are heteroresistant; and diagnosing the subject as susceptible to a combination of the two antibiotics for treatment.

In certain embodiments, this disclosure contemplates methods of diagnosing a subject as susceptible to a combination therapy and treating the subject comprising: obtaining a sample from a subject at risk of, exhibiting symptoms of, or diagnosed with a bacterial infection; growing bacteria in the sample providing a purified bacterial culture; contacting the bacterial culture with a library of antibiotic agents; determining whether the bacterial culture for each antibiotic in the library is either, i) resistant, ii) hetero-resistant, or iii) susceptible; determining a heteroresistant antibiotic provides a lowest frequency resistant subpopulation; and administering to the subject an effective amount of a combination of antibiotics for treatment, wherein each antibiotic in the combination of antibiotics for treatment is determined by the bacterial culture to be heteroresistant in the library, and wherein an antibiotic in the combination of antibiotics for treatment has the lowest frequency resistant subpopulation.

In certain embodiments, this disclosure relates to methods of diagnosing a subject as susceptible to a combination therapy and treating the subject comprising : obtaining a sample from a subject at risk of, exhibiting symptoms of, or diagnosed with a bacterial of microbial infection; growing bacteria or microbe in the sample providing a purified microbial or bacterial culture; contacting the microbial or bacterial culture with two or more or a library of antibiotic agents or antimicrobial agents; determining that two antibiotics to anti-microbials in the library are heteroresistant; and administering to the subject an effective amount of a combination of the two antibiotics or two anti-microbials for treatment.

In certain embodiments, this disclosure relates to methods of diagnosing subject as susceptible a microbial or bacterial combination therapy comprising: obtaining a sample from a subject at risk of, exhibiting symptoms of, or diagnosed with a bacterial of microbial infection; growing bacteria or microbe in the sample providing a purified microbial or bacterial culture; contacting the microbial or bacterial culture with two or more or a library of antibiotic or library of antimicrobial agents; determining that two antibiotics or two anti-microbials in the library are heteroresistant; and diagnosing the subject as susceptible to a combination of the two antibiotics or two anti-microbials for treatment.

In certain embodiments, the library of antibiotic agents or microbial agents is greater than 5, 6, 7, 8, 9, or 10 agents. In certain embodiments, the library of antibiotic agents or microbial agents is greater than 11, 15, 20, or 25 agents. In certain embodiments, the library of antibiotic agents or microbial agents is greater than 30, 40, or 50 agents.

In certain embodiments, none of the antibiotics for treatment are determined to be by the bacterial culture susceptible without heteroresistance to the antibiotic in the library.

In certain embodiments, the library of antibiotics comprises colistin, fosfomycin, ceftazidime, ampicillin, amikacin, gentamicin, tobramycin, aztreonam, cefazolin, cefepime, ciprofloxacin, meropenem, piperacillin, tazobactam, tetracycline, tigecycline, trimethoprim, and/or sulfamethoxazole.

In certain embodiments, the subject is diagnosed with a carbapenem-resistant Enterobacteriaceae bacteria. In certain embodiments, the subject is diagnosed with *Enterobacter* spp., *Klebsiella* spp., and *Escherichia* spp of bacteria. In certain embodiments, the subject is a transplant recipient, on a chemotherapy regiment, or is a premature infant. In certain embodiments, subject is diagnosed with bacteremia, surgical infections, or pneumonia.

In certain embodiments, none of the individual antibiotics or individual combination of antibiotics for treatment are determined to be susceptible by the bacterial culture as an individual antibiotic or as an individual combination by the bacterial culture in the library.

BRIEF DESCRIPTION OF THE DRAWINGS

FIG. 1A shows population analysis profiles (PAPs) of Mu208 and representative susceptible isolates plated on colistin at concentrations relative to its breakpoint. Resistance status of Mu208 to the antibiotic is indicated. Proportion of total colonies was calculated compared to growth on drug-free plates.

FIG. 1R shows data where mice were infected with Mu208 intraperitoneally and treated with indicated ceftazidime and fosfomycin.

FIGS. 2A-D show data indicating multiple heteroresistance is common in carbapenem-resistant *Enterobacteriaceae* (CRE).

FIG. 2A shows a table of data where one hundred and four CRE clinical isolates from a surveillance network in Georgia, USA were screened for heteroresistance to 16 antibiotics using the population analysis profile (PAP) method. Percentages of isolates heteroresistant to each antibiotic are listed, highest in red and lowest in green. Pip/Tazo; piperacillin/tazobactam, Trimeth/Sulfa; trimethoprim/sulfamethoxazole.

FIG. 2B shows data of isolates classified by the number of antibiotics to which they are heteroresistant out of the 16 tested (none were heteroresistant to more than 7) with the percentage heteroresistant to more than one antibiotic indicated by central grey ring.

FIG. 2C illustrates the percentage of clinical susceptibility testing results (for 104 isolates and 16 antibiotics) classified as resistant (black) or susceptible (light grey). Those designated heteroresistant by PAP are indicated by central blue ring.

FIG. 2D shows data representation of all the PAPs of 104 isolates on 16 antibiotics, with lines indicating average bacterial survival at each concentration for all drug-isolate interactions, when segregated into 4 groupings: those classified as resistant by clinical testing and PAP (black circles, "Resistant (R)"), resistant by clinical testing and heteroresistant by PAP (black squares, "Heteroresistant (R)"), susceptible by clinical testing and heteroresistant by PAP (dark grey triangles, "Heteroresistant (S)"), and susceptible by clinical testing and PAP (light grey inverted triangles, "Susceptible (S)").

FIG. 3A is a schematic of the antibiotic combination screen. Eight representative clinical isolates of CRE (4 *K. pneumoniae*, 3 *E. cloacae*, 1 *E. coli*) were treated with 16 antibiotics at the clinical breakpoint concentration alone, or in all 120 possible combinations. Amk, amikacin; Gen, gentamicin; Tob, tobramycin; Amp, ampicillin; Azt, aztreonam; Cfz, cefazolin; Cpm, cefepime; Cft, ceftazidime; Mer, meropenem; PTz, piperacillin/tazobactam; Cip, ciprofloxacin; Col, colistin; Fos, fosfomycin; Tet, tetracycline; Tig, tigecycline; SXT, trimethoprim/sulfamethoxazole.

FIG. 3B is a graph of the number of antibiotic combination/isolate interactions resulting in the indicated number of logs of killing for the subset of cases in which an isolate was classified by clinical testing as resistant to both drugs (R×R).

FIG. 3C shows a table of isolates classified as resistant by clinical testing, and designated by PAP as either resistant (R×R) or heteroresistant (HR×HR) to both drugs, categorized by the number of logs killing observed compared to antibiotic-free control (percentages are shown).

FIG. 3D shows data on antibiotic combinations designated as resistant by clinical testing, and either resistant (R×R; n=117) or heteroresistant (HR×HR; n=36) to both drugs by PAP, categorized by the number of logs of killing when compared to an antibiotic free control, expressed in number of total treatments. n (R×R, n=22; HR×HR, n=10). **** p<0.0001, Mann-Whitney U test of logs killing, binned in 1 log increments.

FIG. 3E shows a table of isolates classified as resistant by clinical testing, and designated as either resistant (R×R) or heteroresistant (HR×HR) to aminoglycoside and beta-lactam.

FIG. 3F shows combinations including both an aminoglycoside and beta-lactam.

FIG. 4A shows an antibiogram of Nevada-2016 as determined by clinical testing (left, using VITEK or E-test), as well as an updated representation of the antibiogram that includes heteroresistance as detected by PAP (right). Fosfomycin breakpoints are not established for *Klebsiella* isolates by the Clinical & Laboratory Standards Institute (CLSI); however, the uropathogenic *E. coli* (UPEC) breakpoint (256 µg ml-1) was used to determine heteroresistance by PAP.

FIG. 4B shows data of PAPs of Nevada-2016 using fosfomycin (Fos, breakpoint 256 µg ml-1), trimethoprim/sulfamethoxazole (SXT, breakpoint 4/76 µg ml-1) or their combination ('dual treatment'). Predicted survival for an additive interaction (dashed black line) was determined by multiplying the survival after each single drug treatment.

FIG. 4C show data when Nevada-2016 was treated with the indicated antibiotics at their breakpoint concentration and plated for enumeration of surviving bacteria at the indicated timepoints over a 48 h period.

FIG. 4D shows images and blanked optical densities (ODs) of Nevada-2016 after 48 h culture in the indicated single or combination antibiotic regimens (Fos and SXT). Media without bacteria (−ctrl) and bacteria in media without antibiotics (+ctrl) are included as controls.

FIG. 4E shows data when AR0040 was used in antibiograms experiments from clinical testing (left) and a modified version to indicate heteroresistance (right).

FIG. 4F shows data on PAPs of AR0040 using amikacin (Amk, breakpoint 64 µg ml-1), piperacillin/tazobactam (PTz, breakpoint 256/4 µg ml-1) or their combination.

FIG. 4G shows data using AR0040 for treatment with Amk, PTz or Amk and PTz.

FIG. 4H shows images and blanked optical densities (ODs) of AR0040 after 48 h.

FIG. 4I shows data where mice were infected intraperitoneally with AR0040 and then treated with phosphate buffered saline (PBS), amikacin (12.5 mg kg-1), piperacillin/tazobactam (80/10 mg kg-1) or their combination (dual treatment), every 12 h, beginning 30 min post infection. Survival was monitored for 150 h.

DETAILED DESCRIPTION

Figure 1A:
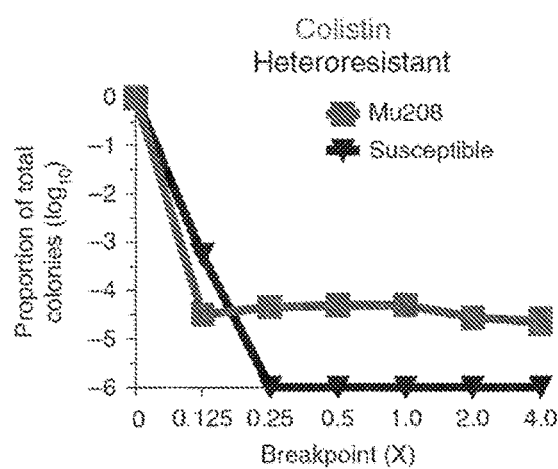
FIGS. 1A-1R show data indicating *Enterobacter* clinical isolate Mu208 is heteroresistant to multiple antibiotics but killed by their combinations.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent. For example, "an antibiotic" refers to one or a combination of antibiotics.

As used in this disclosure and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") have the meaning ascribed to them in U.S. Patent law in that they are inclusive or open-ended and do not exclude additional, unrecited elements or method steps. "Consisting essentially of" or "consists essentially" or the like, when applied to methods and compositions encompassed by the present disclosure refers to compositions like those disclosed herein that exclude certain prior art elements to provide an inventive feature of a claim, but which may contain additional composition components or method steps composition components or method steps, etc., that do not materially affect the basic and novel characteristic(s) of the compositions or methods, compared to those of the corresponding compositions or methods disclosed herein.

A bacterial isolate from a clinical sample can be tested for antibiotic resistance in vitro prior to administering an antibiotic to a patient, using conventional susceptibility tests, such as Etests and broth microdilution. Antibacterial susceptibility tests are typically performed in suspension assays (e.g., broth microdilution assay) or in agar plate assays (e.g., disk diffusion assay). The ETEST or Epsilometer test is a strip containing an antibiotic gradient used to determine whether or not a specific bacterial strain is susceptible to the action of a specific antibiotic. When the Etest strip is placed on an agar surface, the antibiotic gradient on the strip is transferred to the agar creating an imprint of the gradient on the strip in the agar. The bacterial growth becomes visible after incubation and an inhibition ellipse centered along the strip can be seen. The MIC (Minimum Inhibitory Concentration) value is read from the scale where the ellipse edge intersects the strip.

As used herein, the term "resistant" to an antibiotic or combination of antibiotics, in reference to a bacterial culture, refers to contacting the bacterial culture with the antibiotic(s) and observing that the antibiotic(s) does not kill or does not prevent growth of an observable amount of the bacteria.

As used herein, the term "heteroresistance" to an antibiotic or combination of antibiotics, in reference to a bacterial culture, refers to contacting the bacterial culture with the antibiotic(s) and observing that the antibiotic(s) kills or prevents growth of an observable portion, but not all, of the bacterial strain. Sometimes vast majority of the bacterial culture, and other times a low concentrations of bacteria, are resistant to the antibiotic. Some of the individual cells would be susceptible. Nevertheless, the resistant ones would grow out if treating with only that specific antibiotic. Thus, the bacterial culture harbors a subpopulation of cells resistant to the individual antibiotic or individual combination.

As used herein, the terms "susceptible" or "susceptible without heteroresistance" to an antibiotic or combination of antibiotics, in reference to a bacterial culture, refers to contacting the bacterial culture with the antibiotic(s) and observing that the antibiotic(s) kills or prevents the growth of substantially all of the bacteria and wherein observing is under conditions such that heteroresistance would typically be observed, i.e., the bacterial cells are susceptible and there is no observed heteroresistance.

When determining by observation that an antibiotic is resistant, heteroresistant, susceptible in reference to a bacterial culture, it is understood that sensitivity of the assay and the growth rate of the bacteria may alter the observation. For example, if the assay is performed for a short duration of time and the growth rate of the bacteria strain in the culture is slow, the assay may indicate that the antibiotic is susceptible because sufficient time was not allowed for observing growth of a heteroresistant subpopulation. Likewise, if the assay is performed for a long duration of time and the growth rate of the bacterial strain is fast, the assay may indicate that the antibiotic is resistant because sufficient time was allowed for observation of the quick and abundant growth of the heteroresistance subpopulation even though susceptible bacteria may be observed under different conditions.

As used herein, the term "desiccate" or "dehydrate" refers to a solid that results from processes of removing water from a mixture. Water may be removed by merely allowing water to evaporate. In certain embodiment, in order to speed up the process of water removal, the water may be removed by freeze-drying a liquid mixture, i.e., freezing the liquid to form ice and then allowing the ice to rise in temperature, e.g., to room temperature, while the ice is under a vacuum. The desiccated or dehydrated solids may contain residual amounts of water that exist e.g., because of the solids natural tendency to absorb atmospheric water. Typically, the residual water is in an amount of less than 1.0%, 0.5%, or 0.1%, or 0.05%, or 0.01% by weight of the solids.

The term "cationic antibiotic" refers to any variety of antibiotics that contain a protonated amine at physiological pH, e.g., contains one or more quaternary ammonium ions, amine, or guanidine groups. Naturally occurring antimicrobial peptides and aminoglycoside are cationic antibiotics. Antimicrobial peptides typically comprise lysine and arginine amino acids which provide cations at physiological pH. Antimicrobial peptides may have a variety of amino acid sequences; however, they typically fold or present a positively charged domain or face and hydrophobic domain or face which facilitates binding to a lipid bilayer. Aminoglycosides are saccharide or polysaccharide complexes that contain cationic groups, e.g., amino groups or guanidine groups or combinations.

As used herein, the term "polymyxin" refers to the cyclic peptide of the structure: R-(C=O)-Dbu-Thr-Dbu-Dbu-Dbu-Xaa-Yaa-Dbu-Dbu-Thr, (SEQ ID NO: 1) wherein the third Dbu and the C-terminal Thr form a seven-membered cyclic peptide, wherein Dbu is alpha, gama-diaminobuyric acid, Xaa is any amino acid, Yaa is any amino acid, and R is a lipid. In certain embodiments, Xaa is contemplated to be D-Phe or D-Leu. In certain embodiments, Yaa is Leu, Ile, Val, or Nva (Norvaline). In certain embodiments, R(C=O) is 6-methyloctanoyl, 6-methylheptanoyl, octanoyl, heptanoyl, nonanoyl, 3-hydroxy-6-methyloctanoyl, 7-methyloctanoyl, or 7-methylnonanoyl.

As used herein, the term "colistin" refers to a polymyxin and salts thereof (e.g., colistin sulfate) wherein Xaa is D-Leu and Yaa is Leu and R is 5-methyl hexyl or 5-methylheptyl (preparations of colistin may contain different amounts of these R components), wherein the gama-diaminobutyric acid is optionally nitrogen substituted prodrug with methansulfonate, such as in the case of pentasodium colistin-methanesulfonate illustrated in SEQ ID NO: 1 below.

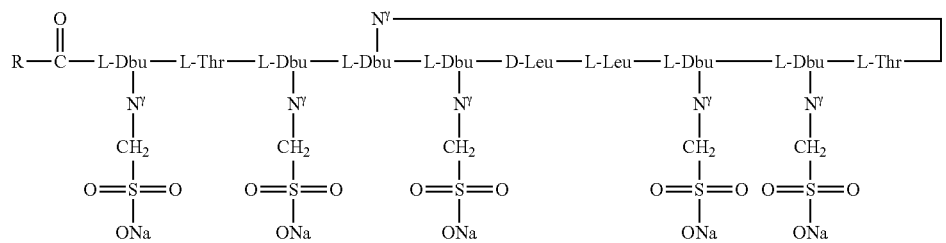

As used herein, the term "derivative" refers to a structurally similar compound that retains sufficient functional attributes of the identified analogue. The derivative may be structurally similar because it is lacking one or more atoms, substituted with one or more substituents, a salt, in different hydration/oxidation states, e.g., substituting a single or double bond, substituting a hydroxy group for a ketone, or because one or more atoms within the molecule are switched, such as, but not limited to, replacing an oxygen atom with a sulfur or nitrogen atom or replacing an amino group with a hydroxyl group or vice versa. Replacing a carbon with nitrogen in an aromatic ring is a contemplated derivative. The derivative may be a prodrug. Derivatives may be prepared by any variety of synthetic methods or appropriate adaptations presented in the chemical literature or as in synthetic or organic chemistry text books, such as those provide in March's Advanced Organic Chemistry: Reactions, Mechanisms, and Structure, Wiley, 6th Edition (2007) Michael B. Smith or Domino Reactions in Organic Synthesis, Wiley (2006) Lutz F. Tietze hereby incorporated by reference.

The term "prodrug" refers to an agent that is converted into a biologically active form in vivo. Prodrugs are often useful because, in some situations, they may be easier to administer than the parent compound. They may, for instance, be bioavailable by oral administration whereas the parent compound is not. The prodrug may also have improved solubility in pharmaceutical compositions over the parent drug. A prodrug may be converted into the parent drug by various mechanisms, including enzymatic processes and metabolic hydrolysis. Typical prodrugs are pharmaceutically acceptable esters. Prodrugs include compounds wherein a hydroxy, amino or mercapto group is bonded to any group that, when the prodrug of the active compound is administered to a subject, cleaves to form a free hydroxy, free amino or free mercapto group, respectively. Examples of prodrugs include, but are not limited to, acetate, formate, and benzoate derivatives of an alcohol or acetamide, formamide, methansulfonate, and benzamide derivatives of an amine functional group in the active compound and the like.

The term "substituted" refers to a molecule wherein at least one hydrogen atom is replaced with a substituent. When substituted, one or more of the groups are "substituents." The molecule may be multiply substituted. In the case of an oxo substituent ("=O"), two hydrogen atoms are replaced. Example substituents within this context may include halogen, hydroxy, alkyl, alkoxy, nitro, cyano, oxo, carbocyclyl, carbocycloalkyl, heterocarbocyclyl, heterocarbocycloalkyl, aryl, arylalkyl, heteroaryl, heteroarylalkyl, —NRaRb, —NRaC(=O)Rb, —NRaC(=O)NRaNRb, —NRaC(=O)ORb, —NRaSO2Rb, —C(=O)Ra, —C(=O)ORa, —C(=O)NRaRb, —OC(=O)NRaRb, —ORa, —SRa, —SORa, —S(=O)$_2$Ra, —OS(=O)$_2$Ra and —S(=O)$_2$ORa. Ra and Rb in this context may be the same or different and independently hydrogen, halogen hydroxyl, alkyl, alkoxy, alkyl, amino, alkylamino, dialkylamino, carbocyclyl, carbocycloalkyl, heterocarbocyclyl, heterocarbocycloalkyl, aryl, arylalkyl, heteroaryl, heteroarylalkyl.

As used herein, a "lipid" group refers to a hydrophobic group that is naturally or non-naturally occurring that is highly insoluble in water. As used herein a lipid group is considered highly insoluble in water when the point of connection on the lipid is replaced with a hydrogen and the resulting compound has a solubility of less than $3 \times 10^{-3}$ w/w (at 25° C.) in water, e.g., $9.5 \times 10^{-4}$% w/w (at 25° C.) which is the percent solubility of hexane in water by weight. See Solvent Recovery Handbook, $2^{nd}$ Ed, Smallwood, 2002 by Blackwell Science, page 193. Examples of naturally occurring lipids include saturated or unsaturated hydrocarbon chains found in fatty acids, glycerolipids, cholesterol, steroids, polyketides, and derivatives. Non-naturally occurring lipids include derivatives of naturally occurring lipids, acrylic polymers, and alkylated compounds and derivatives thereof.

Casamino acids refer to a mixture of amino acids and some peptides obtained from acid hydrolysis of casein. Casamino acids typically contain the essential amino acids except cysteine, because casein has a low content of cysteine in the peptide itself, and tryptophan which is typically destroyed when digested. Hydrolysis it typically performed with sulfuric or hydrochloric acid. In some instances, a third of the weight of the casamino acids may be salts (e.g., NaCl) produced to neutralize the product after hydrolysis. See Mueller & Johnson, Acid Hydrolyates of Casein to Replace Peptone in the Preparation of Bacteriological Media, The Journal of Immunology, 1941 vol. 40 no. 1 33-38. Methods for removing the salts and residual iron are known. See Mueller & Miller, Production of diphtheria toxin of high potency on a reproducible medium. J. Immunol., 1941 40:21-32. In certain embodiments, the disclosure contemplates using casamino acids wherein the amounts of casamino acids are based the presence or absence of the excess salts. Tryptone is the assortment of amino acids and peptides formed by the digestion of casein by the protease trypsin.

The term "sample" can refer to a tissue sample, cell sample, a fluid sample, and the like. A sample may be taken from a host. The tissue sample can include hair (including roots), buccal swabs, blood, saliva, semen, muscle, or from any internal organs. The fluid may be, but is not limited to, urine, blood, ascites, pleural fluid, spinal fluid, semen, wound exudates, sputum, fecal matter, saliva, and the like. The body tissue can include, but is not limited to, skin, muscle, endometrial, uterine, and cervical tissue. While a sample, in the context of the present disclosure, is primarily a biological sample (e.g., from a living host) the sample may also be an environmental sample suspected of contamination by microbes, such as a water sample, food sample, soil sample, and the like. Although a liquid sample and some solid samples may be used as a test sample without modification for testing directly, if a solid sample is to be made into liquid form for testing and/or a liquid sample is to be diluted, a test sample may be made by reconstituting, dissolving, or diluting the sample in a fluid such as water, buffered saline, and the like.

A "growth media" refers to a liquid or permeable solid which contains nutrients that provide essential elements and specific factors that enable microbial growth. Agar is a typical component in solid matrix growth media. Agar is a mixture of agaropectin and agarose. Agar is typically extracted from seaweed. Both agaropectin and agarose have the same galactose-based backbone. Agaropectin is modified with side-groups, such as sulfate and pyruvate. Agar is often combined with nutrients to support microbial growth. In embodiments, agar or agarose can be used as a matrix material to grow bacteria or other microbes. The matrix material is admixed with the nutrients and/or antibiotic or antimicrobial agent prior to placing it on a solid support or substrate. In embodiments, the matrix material is a gel material, such as, agar, agarose, a hydrogel, or a solgel that provides additional structural support and stability. The matrix material provides support for the growth media in the area or zones. Depending on the matrix material, the other materials may be physically encapsulated within the matrix, and/or can be adhered (such as by being covalently attached by a chemical bond) or tethered to the matrix material. In embodiments, the matrix material is at least semi-permeable to allow microbial cells or organisms present in a test sample to permeate the matrix material to contact the growth media or antibiotic within the matrix material.

In some embodiments, the matrix material can include materials such as, a natural or synthetic, agar, agarose, hydrogel, solgel, or combinations. Hydrogels can include substituted and unsubstituted, synthetic and natural hydrogels and can include inorganic polymers, organic polymers (PEG, PLGA, PGA, polyacrylamide, agarose, PVA, gelatin-comethacrylate, etc.) and/or natural polymers (collagen, alginate, matrigel, chitosan). Hydrogels include polysaccharide gels, such as, but not limited to, an alginate, a dextran, a starch, a cellulose, a carrageenan, a poly(hyaluronic acid), a heparin. Other polymers include a polyvinylene, a poly (vinyl acetate), a poly(ethyl vinyl ether, a polyacrylate such as a polymethyl methacrylate, a polystyrene, a polyvinyl silicate, a polyurethane, a polyalkanoate, a poly(lactic acid), a poly(3-hydroxybutyrate), and substituted variations thereof. In embodiments, the matrix material is selected from the group of solgels and hydrogels consisting of: a polyacrylamide, a polyacrylate, a sugar-substituted polyacrylate, polyethylene glycol (PEG), a polyvinyl alcohol, agarose, collagen, matrigel, alginate, chitosan, and other polysaccharide gels. In embodiments, the matrix material includes collagen and/or alginate. The concentration of these hydrogels can range from 0.01% to 10%; depending upon the choice and combinations of the hydrogels.

The term "microorganism" or "microbe" as used herein refers to a small (often, but not always, microscopic) organism that is typically, but not exclusively, single cellular, and includes organisms from the kingdoms bacteria, archaea, protozoa, and fungi. The present disclosure is primarily directed to microorganisms that are pathogenic and capable of causing disease. In embodiments, microorganism includes bacteria and fungi capable of causing disease, particularly disease in humans and other mammals and animals in need of treatment.

The term "detectable" refers to the ability to perceive or distinguish a signal over a background signal. "Detecting" refers to the act of determining the presence of a target or the occurrence of an event by perceiving a signal that indicates the presence of a target or occurrence of an event, where the signal is capable of being perceived over a background signal.

The term "detectable signal" is a signal derived from non-invasive imaging techniques such as, but not limited to, optical imaging (including with the naked eye) (e.g., colorimetric assays), fluorescent imaging, positron emission tomography (PET), single photon emission computed tomography (SPECT), magnetic resonance imaging (MRI), computer topography (CT), or ultrasound. The detectable signal is detectable and distinguishable from other background signals that may be generated from the host or sample. In other words, there is a measurable and statistically significant difference (e.g., a statistically significant difference is enough of a difference to distinguish among the detectable signal and the background, such as about 0.1%, 1%, 3%, 5%, 10%, 15%, 20%, 25%, 30%, or 40% or more difference between the detectable signal and the background) between detectable signal and the background. Standards and/or calibration curves can be used to determine the relative intensity of the detectable signal and/or the background.

In order to detect the viability or growth of microorganisms in spots of an agar or other matrix material, a viability and/or growth detection agent can be used to indicate the presence of or growth of a microorganism in the zone or spot. The growth/detection agent can be a compound capable of producing a detectable signal in the presence of a viable microorganism. Suitable viability/growth detection agents can produce a detectable signal that can be detected by visual inspection (e.g. by the naked eye) or with the assistance of an imaging device. In embodiments, viability/growth detection agents for use with/in the devices of the present disclosure include, but are not limited to, fluorescent molecules/dyes, colorimetric dyes, and chromogenic dyes. In embodiments, the detectable signal is based on a chromogenic signal detected by a chromogenic read out based on the change in pH due to the growth of the organism(s). In embodiments, pH can be measured using standard pH-sensitive reagents such as phenolphthalein, bromothymol blue or methylene red. Such read-outs are particularly useful for clinical or OTC-type assay systems because the assay can be read qualitatively by naked eye or as picture using, e.g., a cell phone. In some embodiments, the viability detection agent is a viability dye capable of indicating viability by producing a chromogenic read-out based on the viability of the organism(s) stained using a viability dye such as Alamar blue or Presto blue. Such embodiments may be useful either for OTC-type assays or more sophisticated laboratory assays. In some aspects detection of viability and/or growth is based on a fluorogenic read-out corresponding to the viability/growth of the organism(s) stained using a viability dye such as, but not limited to, BacLight, FUN1, and the like. The fluorogenic signals/images are read using equipment such as a microarray scanner and analyzed. This assay is highly quantitative and is used in a laboratory setting. While some such viability/growth detection agents indicate the presence of a viable microorganism by producing a signal, they may also detect a level of growth (negatively corresponding to a level of susceptibility to a drug contained on a spot) based on the strength or quality of the signal (e.g., a brighter fluorescence indicates more growth; or a darker color or different color indicates more growth, whereas a fainter fluorescent or fainter/different color indicates less growth, thereby indicating susceptibility).

In embodiments where one or more target microorganisms is a bacterial organism the selective medium in the one or more spots zones of the agar or matrix material is optimized to select for one or more specific types of microorganism (e.g., a specific genus or species of bacteria, or fungi, or both).

In certain embodiments this disclosure contemplates that methods and compositions disclosure herein can be used to identify the resistance of a variety of microbes to a variety of antimicrobial agents. In certain embodiments, the microbes are antimicrobial-resistant gram positive or gram negative bacterial strains selected from, but not limited to, *Abiotrophia defectiva, Acholeplasma* spp., *Actinobaculum suis, Actinomyces bovis, Actinomyces europaeus, Actinomyces georgiae, Actinomyces gerencseriae, Actinomyces graevenitzii, Actinomyces hordeovulneris, Actinomyces israelii* serotype II, *Actinomyces israelii, Actinomyces meyeri, Actinomyces naeslundii, Actinomyces neuii, Actinomyces odontolyticus, Actinomyces radingae, Actinomyces* spp, *Actinomyces turicensis, Actinomyces viscosus, Alloscardovia omnicolens, Anaerococcus hydrogenalis, Anaerococcus lactolyticus, Anaerococcus murdochii, Anaerococcus octavius, Anaerococcus prevotii, Anaerococcus tetradius, Anaerococcus vaginalis, Arcanobacterium (Actinomyces) bernardiae, Arcanobacterium (Actinomyces) pyogenes, Arcanobacterium bernardiae, Arcanobacterium cardiffensis, Arcanobacterium funkei, Arcanobacterium haemolyticum, Arcanobacterium houstonensis, Arcanobacterium lingnae, Arcanobacterium pyogenes (Actinomyces pyogenes), Arthrobacter, Atopobium minutum, Atopobium parvulum, Atopobium rimae, Atopobium* spp, *Atopobium vaginae, Bacillus anthracis, Bacillus cereus, Bacillus circulans, Bacillus licheniformis, Bacillus megaterium, Bacillus melaninogenicus, Bacillus pumilus, Bacillus sphaericus, Bacillus subtilis,* beta haemolytic *Steptococcus* spp, *Bifidobacteria adolescentis, Bifidobacteria dentium, Bifidobacteria scardovii, Bifidobacteria, Brevibacillus brevis, Brevibacillus laterosporus, Brevibacterium, Bulleidia extructa, Catabacter hongkongensis,* CDC coryneform groups F-1 and G, *Clostridiium tetani, Clostridium baratii, Clostridium bifermentans, Clostridium botulinum* (types A, B, C, D, E, F, G), *Clostridium botulinum, Clostridium butyricum, Clostridium chauvoei, Clostridium colinum, Clostridium difficile, Clostridium haemolyticum, Clostridium histolyticum, Clostridium novyi* type A, *Clostridium novyi* type B, *Clostridium novyi, Clostridium perfringens* type A, *Clostridium perfringens* types A-E, *Clostridium perfringens, Clostridium piliforme, Clostridium ramosum, Clostridium septicum, Clostridium sordelli, Clostridium sphenoides, Clostridium spiroforme, Clostridium* spp, *Clostridium tertium, Clostridium tetani, Collinsella aerofaciens, Corynebacterium accolens, Corynebacterium afermentans afermentans, Corynebacterium afermentans lipophilum, Corynebacterium amycolatum, Corynebacterium argentoratense, Corynebacterium aurimucosum, Corynebacterium auris, Corynebacterium bovis, Corynebacterium confusum, Corynebacterium cystidis, Corynebacterium diphtheria, Corynebacterium freneyi, Corynebacterium glucuronolyticum, Corynebacterium jeikeium, Corynebacterium kroppenstedtii, Corynebacterium kutscheri, Corynebacterium lipophiloflavum, Corynebacterium macginleyi, Corynebacterium matruchotii, Corynebacterium minutissimum, Corynebacterium pilosum, Corynebacterium propinquum, Corynebacterium pseudodiphtheriticum, Corynebacterium pseudotuberculosis, Corynebacterium renale, Corynebacterium riegelii, Corynebacterium simulans, Corynebacterium striatum, Corynebacterium sundvallense, Corynebacterium thomssensii, Corynebacterium tuberculostearum, Corynebacterium ulcerans, Corynebacterium urealyticum, Corynebacterium xerosis, Crossiella equi, Dermabacter, Dermatophilus congolense, Dermatophilus congolensis, Eggerthella brachy, Eggerthella hongkongensis, Eggerthella infirmum, Eggerthella lenta, Eggerthella minutum, Eggerthella nodatum, Eggerthella saphenum, Eggerthella sinensis, Eggerthella sulci, Eggerthella tenue, Eggerthella, Enterococcus avium, Enterococcus bovis, Enterococcus casseliflavus/flavescens, Enterococcus cecorum, Enterococcus dispar, Enterococcus durans, Enterococcus faecalis, Enterococcus faecium, Enterococcus gallinarum, Enterococcus gilvus, Enterococcus hirae, Enterococcus italicus, Enterococcus malodoratus, Enterococcus mundtii, Enterococcus pallens, Enterococcus pseudoavium, Enterococcus raffinosus, Enterococcus sanguinicola, Enterococcus* spp, *Erysipelothrix rhusiopathiae, Eubacterium, Filifactor alocis, Finegoldia magna, Gallicola barnesae, Gemella asaccharolytica, Gemella bergeri, Gemella cuniculi, Gemella haemolysans, Gemella morbillorum, Gemella palaticanis, Gemella sanguinis, Gordonia* spp., *Granulicatella adiacens, Granulicatella elegans, Granulicatella para-adiacens, Kytococcus schroeteri, Lactobacillus acidophilus, Lactobacillus casei, Lactobacillus fermentum, Lactobacillus gasseri, Lactobacillus iners, Lactobacillus plantarum, Lactobacillus rhamnosus, Lactobacillus* species, *Lactobacillus ultunensis, Leifsonia aquatic, Leuconostoc citreum, Leuconostoc lactis, Leuconostoc mesenteroides, Leuconostoc paramesenteroides, Leuconostoc pseudomesenteroides, Listeria grayi, Listeria innocua, Listeria ivanovii, Listeria monocytogenes, Listeria seeligeri, Listeria welshimeri, Microbacterium, Mobiluncus curtisii, Mobiluncus mulieris, Mobiluncus* spp, *Mogibacterium timidum, Mogibacterium vescum, Moryella indoligenes, Mycobacterium senegalense, Mycobacterium abscessus, Mycobacterium africanum, Mycobacterium arupense, Mycobacterium asiaticum, Mycobacterium aubagnense, Mycobacterium avium* complex, *Mycobacterium avium* subsp *paratuberculosis, Mycobacterium avium, Mycobacterium bolletii, Mycobacterium bovis, Mycobacterium branderi, Mycobacterium canettii, Mycobacterium caprae, Mycobacterium celatum, Mycobacterium chelonae, Mycobacterium chimaera, Mycobacterium colombiense, Mycobacterium conceptionense, Mycobacterium conspicuum, Mycobacterium elephantis, Mycobacterium farcinogenes, Mycobacterium florentinum, Mycobacterium fortuitum* group, *Mycobacterium genavense, Mycobacterium goodii, Mycobacterium haemophilum, Mycobacterium heckeshornense, Mycobacterium heidelbergense, Mycobacterium houstonense, Mycobacterium immunogenum, Mycobacterium interjectum, Mycobacterium intracellulare, Mycobacterium kansasii, Mycobacterium lacus, Mycobacterium lentiflavum, Mycobacterium leprae, Mycobacterium lepraemurium, Mycobacterium mageritense, Mycobacterium malmoense, Mycobacterium marinum, Mycobacterium massiliense, Mycobacterium microti, Mycobacterium montefiorense* (eels), *Mycobacterium moracense, Mycobacterium mucogenicum, Mycobacterium nebraskense, Mycobacterium neoaurum, Mycobacterium novocastrense, Mycobacterium palustre, Mycobacterium paratuberculosis* (Johne's Disease), *Mycobacterium parmense, Mycobacterium phlei, Mycobacterium phocaicum, Mycobacterium pinnipedii, Mycobacterium porcinum, Mycobacterium pseudoshottsii* (fish), *Mycobacterium pseudotuberculosis, Mycobacterium saskatchewanense, Mycobacterium scrofulaceum, Mycobacterium senuense, Mycobacterium septicum, Mycobacterium simiae, Mycobacterium smegmatis, Mycobacterium* spp, *Mycobacterium* szulgai, *Mycobacterium terrae*/chromogenicum complex, *Mycobacterium triplex, Mycobacterium tuberculosis, Mycobacterium tusciae, Mycobacterium ulcerans, Mycobacterium wolinskyi, Mycobacterium xenopi, Mycobacterium, Nocardia asteroides, Nocardia brasiliensis, Nocardia farcinica, Nocardia nova, Nocardia otitidiscaviarum, Nocardia* spp, *Nocardia transvalensis, Oerskovia, Olsenella* oral spp, *Olsenella profuse, Olsenella uli, Oribacterium sinus, Paenibacillus alvei, Parvimonas micra, Pediococcus, Peptococcus indolicus, Peptococcus niger, Peptoniphilus asaccharolyticus, Peptoniphilus gorbachii, Peptoniphilus harei, Peptoniphilus indolicus, Peptoniphilus ivorii, Peptoniphilus lacrimalis, Peptoniphilus olsenii, Peptostreptococcus anaerobius, Peptostreptococcus stomatis, Propionibacterium acnes, Propionibacterium granulosum, Propionibacterium propionicum, Propionibacterium, Pseudoramibacter alactolyticus, Rhodococcus equi, Rhodococcus erythropolis, Rhodococcus fasciens, Rhodococcus rhodochrous, Rothia, Ruminococcus productus, Slackia exigua, Slackia heliotrinireducens, Solobacterium moorei, Staphylococcus arlettae, Staphylococcus aureus* subsp. *anaerobius, Staphylococcus aureus, Staphylococcus auricularis, Staphylococcus capitis* subsp. *capitis, Staphylococcus capitis* subsp. *urealyticus, Staphylococcus capitis, Staphylococcus caprae, Staphylococcus carnosus, Staphylococcus caseolyticus, Staphylococcus chromogenes, Staphylococcus cohnii* subsp. *cohnii, Staphylococcus cohnii* subsp. *urealyticus, Staphylococcus cohnii, Staphylococcus condimenti, Staphylococcus delphini, Staphylococcus epidermidis, Staphylococcus equorum, Staphylococcus felis, Staphylococcus fleurettii, Staphylococcus gallinarum, Staphylococcus haemolyticus, Staphylococcus hominis, Staphylococcus hyicus, Staphylococcus intermedius, Staphylococcus kloosii, Staphylococcus lentus, Staphylococcus lugdunensis, Staphylococcus lutrae, Staphylococcus muscae, Staphylococcus nepalensis, Staphylococcus pasteuri, Staphylococcus pettenkoferi, Staphylococcus piscifermentans, Staphylococcus pseudintermedius, Staphylococcus pulvereri, Staphylococcus saccharolyticus, Staphylococcus saprophyticus, Staphylococcus schleiferi* subsp. *coagulans, Staphylococcus schleiferi, Staphylococcus sciuri, Staphylococcus simiae, Staphylococcus simulans, Staphylococcus* spp, *Staphylococcus succinus, Staphylococcus vitulinus, Staphylococcus warneri, Staphylococcus xylosus, Staphylococcus vitulinus, Stomatococcus mucilaginosus* (reclassified as *Rothia mucilaginosa*), *Streptococcus agalactiae, Streptococcus anginosus* species group (*Streptococcus intermedius, Streptococcus constellatus,* and *Streptococcus anginosus*), *Streptococcus bovis* species group (*S. gallolyticus* subsp. *gallolyticus* (formerly *S. bovis* biotype I), *Streptococcus bovis, Streptococcus canis, Streptococcus dysgalactiae* subsp. *dysgalactiae, S. equi* subsp. *equi, S. equi* subsp. *zooepidemicus, S. porcinus, S. canis, S. suis, S. iniae*), *Streptococcus dysgalactiae* subsp. *equisimilis, Streptococcus dysgalactiae, Streptococcus equi* (*Streptococcus equi* subsp *equi*), *Streptococcus equi* subsp. *zooepidemicus, Streptococcus equi, Streptococcus equinus, Streptococcus equisimilis* (*Streptococcus dysgalactiae* subsp *equisimilis*), *Streptococcus gallolyticus* subsp. *pasteurianus* (formerly *S. bovis* biotype II/2), *Streptococcus infantarius* subsp *Infantarius, Streptococcus lutetiensis* (formerly *S. bovis* biotype II/1), *Streptococcus mitis* species group (*S. cristatus, S. infantis, S. mitis, S. oxalis, S. peroris, S. orisratti*), and *Streptococcus mutans* species group (*S. cricetus, S. downei, S. fetus, S. hyovaginalis, S. macaccae, S. mutans, S. ratti, S. sobrinus,* Sanguinis Group, *S. gordonii, S. parasanguinis, S. sanguinis*), *Streptococcus pneumoniae, Streptococcus porcinus, Streptococcus pyogenes, Streptococcus salivarius* species group (*S. alactolyticus, S. hyointestinalis, S. infantarius, S. salivarius, S. thermophilus, S. vestibularis*), *Streptococcus* spp, *Streptococcus suis, Streptococcus uberis, Streptococcus zooepidemicus* (*Streptococcus equi* subsp *zooepidemicus*), *Streptococcus zooepidemicus, Trueperella abortisuis, Trueperella bernardiae, Trueperella bialowiezensis, Trueperella bonasi, Trueperella pyogenes* (*Arcanobacterium pyogenes*), *Tsukamurella* spp., *Turicella,* and *Turicibacter sanguine,* Acetic acid bacteria, *Acinetobacter* spp., *Acinetobacter baumannii, Agrobacterium tumefaciens, Anaerobiospirillum, Anaerolinea thermolimosa, Anaerolinea thermophila, Arcobacter, Arcobacter skirrowii, Armatimonas rosea, Azotobacter salinestris, Bacteroides, Bacteroides fragilis, Bacteroides ureolyticus, Bacteroidetes, Bartonella, Bartonella japonica, Bartonella henselae, Bartonella koehlerae, Bartonella taylorii, Bdellovibrio, Brachyspira, Bradyrhizobium japonicum, Brucella, Brucella abortus, Brucella canis, Brucella ceti, Brucella inopinata, Brucella melitensis, Brucella microti, Brucella neotomae, Brucella ovis, Brucella pinnipedialis, Brucella suis, Burkholderia, Burkholderia cenocepacia, Burkholderia cepacia, Burkholderia pickettii, Burkholderia thailandensis, Burkholderia ubonensis, Burkholderia udeis, Caldilinea aerophila, Campylobacter, Campylobacter coli, Campylobacter concisus, Campylobacter fetus, Campylobacter hyointestinalis, Campylobacter jejuni, Campylobacter lanienae, Campylobacter lari, Campylobacter mucosalis, Campylobacter pylori, Campylobacter rectus, Campylobacter showae, Campylobacter upsaliensis, Cardiobacterium hominis, Chlamydia, Chlamydia muridarum, Chlamydia pecorum, Chlamydia pneumoniae, Chlamydia psittaci, Chlamydia suis, Chlamydia trachomatis, Christensenella, Chthonomonas calidirosea, Citrobacter frendii, Citrobacter gillenii, Citrobacter Koseri, Citrobacter rodentium, Citrobacter werkmanii, Coxiella burnetii, Cyanobacteria, Cytophaga, Dehalogenimonas lykanthroporepellens, Desulfurobacterium atlanticum, Devosia pacifica, Devosia psychrophila, Devosia soli, Devosia subaequoris, Devosia submarina, Devosia yakushimensis, Dialister, Dictyoglomus thermophilum, Enterobacter, Enterobacter aerogenes, Enterobacter agglomerans, Enterobacter arachidis, Enterobacter asburiae, Enterobacter cancerogenous, Enterobacter cloacae, Enterobacter cloacae* complex, *Enterobacter cowanii, Enterobacter dissolvens, Enterobacter gergoviae, Enterobacter helveticus, Enterobacter intermedius, Enterobacter kobei, Enterobacter ludqigii, Enterobacter pulveris, Enterobacter pyrinus, Enterobacter taylorae, Enterobacter turicensis, Enterobacter sakazakii, Enterobacteriaceae, Enterobacteriales, Escherichia, Escherichia albertii, Escherichia coli, Escherichia fergusonii, Escherichia hermannii, Escherichia vulneris, Fimbriimonas ginsengisoli, Flavobacterium, Francisella tularensis, Francisella novicida, Francisella guangzhouensis, Francisella halioticida, Francisella hispaniensis, Francisella holarctica, Francisella mediasiatica, Francisella noatunensis, Francisella noatunensis* sub sp. *noatunensis, Francisella noatunensis* subsp. *orientalis, Francisella persica, Francisella philomiragia, Francisella philomiragia* subsp. *noatunensis, Francisella philomiragia* subsp. *philomiragia, Francisella piscicida, Francisella* spp., *Fusobacterium necrophorum, Fusobacterium nucleatum, Fusobacterium polymorphum, Haemophilus felis, Haemophilus haemolyticus, Haemophilus influenzae, Haemophilus pittmaniae, Helicobacter, Helicobacter acinonychis, Helicobacter anseris, Helicobacter bilis, Helicobacter canadensis, Helicobacter canis, Helicobacter hepaticus, Helicobacter muridarum, Helicobacter pametensis, Helicobacter pullorum, Helicobacter pylori,*

*Helicobacter rodentium, Helicobacter salomonis, Kingella kingae, Klebsiella, Klebsiella granulomatis, Klebsiella michiganensis, Klebsiella oxytoca, Klebsiella pneumoniae, Klebsiella quasipneumoniae, Klebsiella terrigena, Klebsiella variicola, Kluyvera ascorbata, Kluyvera cryocrescens, Kozakia baliensis, Legionella, Legionella adelaidensis, Legionella anisa, Legionella beliardensis, Legionella birminghamensis, Legionella bozemanae, Legionella brunensis, Legionella busanensis, Legionella cardiaca, Legionella cherrii, Legionella cincinnatiensis, Legionella clemsonensis, Legionella donaldsonii, Legionella drancourtii, Legionella dresdenensis, Legionella drozanskii, Legionella dumoffii, Legionella erythra, Legionella fairfieldensis, Legionella fallonii, Legionella feeleii, Legionella geestiana, Legionella gormanii, Legionella gratiana, Legionella gresilensis, Legionella hackeliae, Legionella impletisoli, Legionella israelensis, Legionella jamestowniensis, Legionella jeonii, Legionella jordanis, Legionella lansingensis, Legionella londiniensis, Legionella longbeachae, Legionella lytica, Legionella maceachernii, Legionella massiliensis, Legionella micdadei, Legionella monrovica, Legionella moravica, Legionella nagasakiensis, Legionella nautarum, Legionella norrlandica, Legionella oakridgensis, Legionella parisiensis, Legionella pittsburghensis, Legionella pneumophila, Legionella quateirensis, Legionella quinlivanii, Legionella row bothamii, Legionella rubrilucens, Legionella sainthelensi, Legionella santicrucis, Legionella shakespearei, Legionella spiritensis, Legionella steelei, Legionella steigerwaltii, Legionella taurinensis, Legionella tucsonensis, Legionella tunisiensis, Legionella wadsworthii, Legionella waltersii, Legionella worsleiensis, Legionella yabuuchiae, Leptotrichia buccalis, Levilinea saccharolytica, Luteimonas aestuarii, Luteimonas aquatica, Luteimonas composti, Luteimonas lutimaris, Luteimonas marina, Luteimonas mephitis, Luteimonas vadosa, Megamonas, Megasphaera, Meiothermus, Meiothermus timidus, Methylobacterium fujisawaense, Morax-Axenfeld diplobacilli, Moraxella, Moraxella bovis, Moraxella osloensis, Morganella morganii, Mycobacterium, Mycoplasma spumans, Negativicutes, Neisseria cinerea, Neisseria gonorrhoeae, Neisseria meningitidis, Neisseria polysaccharea, Neisseria sicca, Nitrosomonas eutropha, Nitrosomonas halophila, Nitrosomonas oligotropha, Paraburkholderia, Pectinatus, Pedobacter heparinus, Pelosinus, Propionispora, Proteobacteria, Proteus mirabilis, Proteus penneri, Pseudomonas, Pseudomonas aeruginosa, Pseudomonas fluorescens, Pseudomonas luteola, Pseudomonas putida, Pseudomonas syringae, Pseudoxanthomonas broegbernensis, Pseudoxanthomonas japonensis, Rickettsia rickettsii, Salinibacter ruber, Salmonella, Salmonella bongori, Salmonella enterica, Samsonia, Selenomonadales, Serratia marcescens, Shewanella algae, Shewanella baltica, Shewanella Shigella, Shigella boydii, Shigella dysenteriae, Shigella flexneri, Shigella sonnei, Shimwellia decolorationis, Shewanella frigidmarina, Shewanella gelidimarina, Shewanella halitosis, Shewanella livingstonensis, Shewanella oneidensis, Shewanella putrefaciens, Shewanella sediminis, Shewanella violacea, Shewanella woodyi, Sorangium cellulosum, Sphaerotilus natans, Sphingomonas gei, Spirochaeta, Spirochaetaceae, Sporomusa, Stenotrophomonas, Stenotrophomonas maltophilia, Stenotrophomonas nitritireducens, Thermotoga neapolitana, Thorselliaceae, Vampirococcus, Verminephrobacter, Vibrio adaptatus, Vibrio azasii, Vibrio campbellii, Vibrio casei, Vibrio cholerae, Vibrio coralliiyticus, Vibrio cyclitrophicus, Vibrio diabolicus, Vibrio fluvialis, Vibrio furnissii, Vibrio harveyi, Vibrio mimicus, Vibrio mytili, Vibrio natriegens, Vibrio ordalii, Vibrio parahaemolyticus, Vibrio pectenicida, Vibrio tapetis, Vibrio vulnificus, Victivallis vadensis, Vitreoscilla, Wigglesworthia, Wigglesworthia glossinidia, Wolbachia, Yersinia, Yersinia aldovae, Yersinia bercovieri, Yersinia enterocolitica, Yersinia intermedia, Yersinia kristensenii, Yersinia mollaretii, Yersinia pestis, Yersinia pseudotuberculosis, Yersinia ruckeri, Zymophilus.*

In certain embodiments, the antimicrobial is an antibiotic selected from the group comprising, but not limited to, 2,4-DIAMINOPYRIMIDINES, including Baquiloprim, Brodimoprim, Iclaprim, Ormetoprim, Pyrimethamine, Tetroxoprim, Trimethoprim; AMINOCOUMARINS, including Novobiocin; AMINOCYCLITOLS, including Spectinomycin; AMINOGLYCOSIDES, including Amikacin, Apramycin, Arbekacin, Bekanamycin, Butirosin, Dibekacin, Dihydrostreptomycin, Etimicin, Fortimicins (Astromicin), Framycetin, Gentamicin, Hygromycin B, Isepamicin, Kanamycin, Micronomicin, Neomycin, Netilmicin, Paromomycin, Plazomicin, Ribostamycin, Sisomicin, Streptomycin, Tobramycin, Verdamicin; AMINOMETHYLCYCLINES, including Omadacycline; AMPHENICOLS, including Azidamfenicol, Chloramphenicol, Florfenicol, Thiamphenicol; ANSAMYCINS, including Rifabutin, Rifamide, Rifampin (Rifampicin), Rifamycin, Rifapentine, Rifaximin; ANTISEPTIC AGENTS, including Acridine derivatives (including acriflavine, aminoacridine, ethacridine, proflavine), Bispyridines (including octenidine dihydrochloride), Brominated salicylanilides (including bromsalans), Chlorhexidine, Phenol derivatives (including thymol and triclosan), Quarternary ammonium compounds (including Alkyldimethylethylbenzyl Ammonium Chloride, benzalkonium chloride, cetylpyridinium chloride, benzethonium chloride, cetrimonium); ANTITUBERCULAR AGENTS, including Cycloserine, Delamanid, Ethambutol, Ethionamide, Isoniazid (Ftivazide), Morinamide, p-Aminosalicylic Acid (PAS), Protionamide, Pyrazinamide, Terizidone, Thioacetazone, Tiocarlide; ARSENICALS, including Arsanilic Acid, Roxarsone; BACTERIOCINS, including Nisin, Brilacidin (PMX-30063); BENZOFURAN-NAPHTHYRIDINES, including Debio 1450; BENZYL-PYRIDINONES, including CG400549; B-LACTAM CARBACEPHEMS, including Loracarbef; B-LACTAM CARBAPENEMS, including Biapenem, Doripenem, Ertapenem, Faropenem, Imipenem, Meropenem, Panipenem, Razupenem, Ritipenem, Sulopenem, Tebipenem, Tomopenem; B-LACTAM CEPHALOSPORINS, including Cefacetrile, Cefaclor, Cefadroxil, Cefalexin, Cefaloglycin, Cefalonium, Cefaloridine, Cefalothin, Cefamandole, Cefapirin, Cefatrizine, Cefazaflur, Cefazedone, Cefazolin, Cefcapene, Cefdinir, Cefditoren, Cefepime, Cefetamet, Cefixime, Cefmenoxime, Cefodizime, Cefonicid, Cefoperazone, Ceforanide, Cefoselis, Cefotaxime, Cefotiam, Cefovecin, Cefozopran, Cefpimizole, Cefpiramide, Cefpirome, Cefpodoxime, Cefprozil, Cefquinome, Cefradine, Cefroxadine, Cefsulodin, Ceftaroline, Ceftazidime, Cefteram, Ceftezole, Ceftibuten, Ceftiofur, Ceftizoxime, Ceftobiprole, Ceftolozane, Ceftradine, Ceftrezole, Ceftriaxone, Ceftroxadine, Cefuroxime, Cefuzonam, GSK-3342830, Pivcefalexin; B-LACTAM CEPHAMYCINS, including Cefbuperazone, Cefmetazole, Cefminox, Cefotetan, Cefoxitin; B-LACTAM MONOBACTAMS, including Aztreonam, Carumonam, Tigemonam; B-LACTAM OXACEPHEMS, including Flomoxef, Latamoxef, Moxalactam; B-LACTAM PENICILLINS, including Amdinocillin (Mecillinam), Amoxicillin, Ampicillin, Apalcillin, Aspoxicillin, Azidocillin, Azlocillin, Bacampicillin, Carbenicillin, Carindacillin, Ciclacillin, Clemizole Penicillin, Clometocillin, Cloxacillin, Cyclacillin, Dicloxacillin, Epicillin, Fenbenicillin, Floxacillin (Flucloxacillin), Hetacillin, Lenampicillin, Mecillinam, Metampicillin, Methicillin Sodium, Mezlocillin, Nafcillin, Oxacillin, Penamecillin, Penethamate Hydroiodide, Penicillin G, Penicillin G Benzathine, Penicillin G Procaine, Penicillin N, Penicillin O, Penicillin V, Phenethicillin Potassium, Piperacillin, Pivampicillin, Pivmecillinam, Propicillin, Quinacillin, Sulbenicillin, Sultamicillin, Talampicillin, Temocillin, Ticarcillin; B-LACTAMS in combination with B-LACTAMASE INHIBITORS, including Avibactam, Clavulanic Acid, Relebactam, RG6080 (OPO595), RPX7009, Sulbactam, Tazobactam, Vaborbactam, Zidebactam; BICYCLOMYCINS, including Bicozamycin; BIS-BENZIMIDAZOLES, including ridinilazole; BORON CONTAINING ANTIBACTERIAL AGENTS, including AN3365 (aminomethylbenzoxaboroles), GSK2251052 (leucyl-tRNA synthetase inhibitors); CYCLIC ESTERS, including Fosfomycin; DISTAMYCINS, including MGB-BP-3; FATTY ACID SYNTHESIS INHIBITORS (FabI), AFN-1252, MUT056399, FAB-001; FLUOROQUINOLONES, including Avarofloxacin, Balofloxacin, Besifloxacin, Chinfloxacin, Cinoxacin, Ciprofloxacin, Clinafloxacin, Danofloxacin, Delafloxacin, Difloxacin, Enoxacin, Enrofloxacin, Finafloxacin, Fleroxacin, Flumequine, Garenoxacin, Gatifloxacin, Gemifloxacin, Grepafloxacin, Ibafloxacin, Levofloxacin, Lomefloxacin, Marbofloxacin, Miloxacin, Moxifloxacin, Nadifloxacin, Norfloxacin, Ofloxacin, Orbifloxacin, Pazufloxacin, Pefloxacin, Pradofloxacin, Prulifloxacin, Rosoxacin, Rufloxacin, Sarafloxacin, Sitafloxacin, Sparfloxacin, Temafloxacin, Tosufloxacin, Trovafloxacin, WCK 771, WCK 2349, Zabofloxacin; FLUOROVINYL-THIOPHENES, including CRS3123; FUSIDANES, including Fusidic Acid; GLYCOLIPODEPSIPEPTIDE, including Ramoplanin; GLYCOPEPTIDES, including Avoparcin, Dalbavancin, Norvancomycin, Oritavancin, Teicoplanin, Telavancin, Vancomycin; GLYCOPEPTIDE-BETA-LACTAM HYBRIDS, including TD-1607; GLYCOPHOSPHOLIPIDS, including Bambermycins (bambermycin, moenomycins, flavophospholipol); GLYCYLCYCLINES, including Tigecycline; HYBRIDS, Cadazolid (Oxazolidinone-quinolone), TD-1792 (glycopeptide-cephalosporin); LINCOSAMIDES, including Clindamycin, Lincomycin, Pirlimycin; LIPOPEPTIDES, including Daptomycin, Surotomycin; MACROLIDES, including Azithromycin, Carbomycin, Cethromycin, Clarithromycin, Dirithromycin, Erythromycin, Fidaxomicin, Flurithromycin, Gamithromycin, Josamycin, Kitasamycin, Leucomycin, Meleumycin, Midecamycins, Miokamycin, Mirosamycin, Oleandomycin, Primycin, Rokitamycin, Rosaramicin, Roxithromycin, Sedecamycin, Solithromycin, Spiramycin, Telithromycin, Terdecamycin, Tildipirosin, Tilmicosin, Troleandomycin, Tulathromycin, Tylosin, Tylvalosin, WCK 4873; NITROFURANS, including Furaltadone, Furazidin, Furazolidone, Furazolium Chloride, Nifuratel, Nifurfoline, Nifuroxazide, Nifurpirinol, Nifurtoinol, Nifurzide, Nitrofural, Nitrofurantoin, Nitrofurazone; NITROIMIDAZOLES, including Dimetridazole, Metronidazole, Ornidazole, Ronidazole, Secnidazole, Tinidazole; OLIGOSACCHARIDES, including Avilamycin, Everninomicin; OTHER ANTIBACTERIAL AGENTS, including Auriclosene, Chloroxine, Chlorquinaldol, Clioquinol, Clofoctol, Halquinol, Lotilibcin, Mandelic Acid, Methenamine (hexamine), Nitazole, Nitroxoline, Perchlozone, Taurolidine, Thenoic Acid, Xibornol; OXAZOLIDINONES, including Eperezolid, LCB01-0371, Linezolid, MRX-I, Posizolid, Radezolid, Sutezolid, Tedizolid (Torezolid); OXAZOLIDINONE-QUINOLONE HYBRIDS, including MCB3837; PEPTIDES, including Omiganan, Pexiganan; PLEUROMUTILINS, including Lefamulin, Retapamulin, Tiamulin, Valnemulin; POLYETHER IONOPHORES, including Laidlomycin, Lasalocid, Maduramicin, Monensin, Narasin, Salinomycin, Semduramicin; POLYMYXINS, including Colistin, Polymyxin B; POLYPEPTIDES, including Amphomycin, Bacitracin, Capreomycin, Enduracidin, Enramycin, Enviomycin, Fusafungine, Gramicidin(s), Iseganan, Magainins, Nosiheptide, Ristocetin, Thiostrepton, Tuberactinomycin, Tyrocidine, Tyrothricin, Viomycin; PSEUDOMONIC ACIDS, including Mupirocin; QUINOLONES, including Nalidixic Acid, Nemonoxacin, Oxolinic Acid, Ozenoxacin, Pipemidic Acid, Piromidic Acid; QUINOXALINES, including Carbadox, Olaquindox; RIMINOFENAZINES, including Clofazimine; SIDEROPHORE-LINKED ANTIBIOTICS, including Cefiderocol; SPIROPYRIMIDENETRIONES, including ETX0914; STATINS, including Atorvastatin, Fluvastatin, Lovastatin, Mevastatin, Pitavastatin, Pravastatin, Rosuvastatin, Simvastatin; STREPTOGRAMINS, including Dalfopristin, Flopristin, Linopristin, Pristinamycin, Quinupristin, Virginiamycin; STREPTOTHRICINS, including Nourseothricin; SULFONAMIDES, including Acetyl Sulfamethoxypyrazine, Chloramine-B, Chloramine-T, Dichloramine T, Formosulfathiazole, Mafenide, N4-Sulfanilylsulfanilamide, Noprylsulfamide, N-Sulfanilyl-3,4-xylamide, Ormaosulfathiazole, Phthalylsulfacetamide, Phthalylsulfathiazole, Salazosulfadimidine, Succinylsulfathiazole, Sulfabenzamide, Sulfacarbamide, Sulfacetamide, Sulfachlorpyridazine, Sulfachrysoidine, Sulfaclozine, Sulfacytine, Sulfadiazine, Sulfadicramide, Sulfadimethoxine, Sulfadimidine, Sulfadoxine, Sulfaethidole, Sulfaguanidine, Sulfaguanole, Sulfalene, Sulfaloxic Acid, Sulfamerazine, Sulfameter, Sulfamethazine, Sulfamethizole, Sulfamethomidine, Sulfamethoxazole, Sulfamethoxypyridazine, Sulfamethylthiazole, Sulfametopyrazine, Sulfametrole, Sulfamidochrysoidine, Sulfamonomethoxine, Sulfamoxole, Sulfanilamide, Sulfanilylurea, Sulfaperine, Sulfaphenazole, Sulfaproxyline, Sulfapyrazine, Sulfapyridine, Sulfaquinoxaline, Sulfathiazole, Sulfathiourea, Sulfatroxazole, Sulfisomidine, Sulfisoxazole (Sulfafurazole); SULFONES, including Acediasulfone, Dapsone, Glucosulfone Sodium, p-Sulfanilylbenzylamine, Succisulfone, Sulfanilic Acid, Sulfoxone Sodium, Thiazolsulfone; TETRACYCLINES, including Chlortetracycline, Clomocycline, Demeclocycline, Doxycycline, Eravacycline, Guamecycline, KBP-7072, Lymecycline, Meclocycline, Methacycline, Minocycline, Oxytetracycline, Penimepicycline, Pipacycline, Rolitetracycline, Sarecycline, Tetracycline, TP-271, TP-6076; TRIAZAACENAPHTHYLENE, including Gepotidacin; or another antibiotic selected from the group comprising, but not limited to Abaecin, Acanthoscurrins, Acidocins, Alpha defensins, Aminoglycosides, Androconin, Angiogenins, Anti LPS Factors, Antimicrobial peptides, Apidaecins, Arasins, Arenicins, Arminins, Arminin-1a, Astracidins, Aureocins, Bactenecins, Bactenecins 5, Bacteriocins, Bacteriocin 32, Bactofencins, Bactridines, Batroxicidins, BacW2R, Beta defensins, HBD-3, MBD-14,BBD 1-13, Buforins, Buforin I, Buthinin, Cationic Steroid antibiotics, CAPs, CAP11, CAP18, Callinectins, Cathelicidins, Cathelicidin-AL, Cathelicidin-BF, Centrocins, CodCath, aCATH, OH-CATH, BF-CATH, NA-CATH, HC-CATH, CATH-BRALE, CCLs, CCL11, CCL13, CCL21, CCL25, CCL28, mCCL28, Cecropins, Cecropin A-B, CEMA, Ceragenins, Ceratotoxins, Chensinins, Chrysophin, CP-α2, Coleoptericins, Colistin, CP-11CN, Copsins, Corticostatins, CP-10A, CRAMPs, CY-AMPS, Crotalicidins, CsCCK1, CXCLs, CXCL9, CXCL10, CXCL11, CXCL13, CXCL14, Crotamines, Cryptdins, Cryptonins, Cupiennins, Cyclic L27-11, Cyto-insectotoxins, Cyto-insectotoxins 1a, Defensins, Defensin-like peptides, Dermaseptins, DP1, Enterocins, Eotaxins, Eotaxin-3, Epilancins, Esculentins, Esculentin-1, Gaegurins, Gaegurin-1, Gallinacins, GLKs, Gloverins, Gomesin, Gramicidins, Gramicidin S, Granulysins, Guentherins, Hejiangins, Heterins, Heterophil peptides, HMGN2, Human granulysin, Hyastatin, SpHyastatin, Hipposin, Histatins, Hordothionins, HNP1, Hydramacins, Hymenochirins, Hyphancins, Indolicidin, IB antimicrobial peptides, IB-367, Ixodidins, Kenojeinins, Lacticins, Lactoferricins, Lactoferrin B, Lasioglossins, Lasiocepsins, Latarcins, Lingual antimicrobial peptides, Longicins, LL-29, LL-37, RL-37, Lycosins, Lycotoxins, Lysozyme, Magainin II, Maize Basic Peptides, Melimine, Melittin, Microcins, Misgurins, MjPen-II, MMGPs, Molluscidin, hdMolluscidin, Moricins, MSI-78, Muc7 20-Mer, Mytichitins, Myticins, Mytilins, Mytimacins, Myeloid antimicrobial peptides, Nabaecin-3, Neosporin, Neutrophil cationic peptides, NRCs, OaBAC5, OaBAC7.5, OaBAC6, Odorranains, Onchorhyncin III, Opiscorpines, Oreochromicins, OtTx1a, Oxyopinins, P18, P83287, PMAP-36, POL7080, PR-39, PV5, Palustrins, Panurgines, Papiliocins, Parabutoporins, Parasins, Penaeidins, Perinerin, Phoratoxins, Piceains, Pilosulins, Piscidins, Piscidins 5, Plantaricins, Pleurains, Polyphemusins, Polyphemusin I, Polymyxin B, Polymyxin E, Polysporin, Ponericins, Porcine lysins, PP13, Procambarin, Protegrins, Prophenins, Purothionins, Pyrularia thionins, RHAMP, RNases, RNase 3, Human RNase 5, RNase 7, Sarcotoxins, Scapularisins, Scolopins, Scolopendrasins, SLP1, sfTSLP, sPLA2-IIA, Snakins, Spiderine PLA2, Stomoxyns, Strongylocins, Styelins, Tachystatins, Tachyplesins, Thanatin, Theta defensins, Thionin-like antimicrobial peptides, Trichoplaxins, BTD, Ubiquicidin, Virescein, WAM1, WLBU2, XCLs, XCL1.

Methods of Use

In certain embodiments this disclosure contemplates detecting heteroresistance to guide antibiotic or other antimicrobial therapy. In certain embodiments, this disclosure contemplates avoiding a monotherapy with antibiotics to which an individual bacterial isolate is heteroresistant, because this can lead to treatment failure. Thus, in certain embodiments, one uses of antibiotics to which a bacterium is individually heteroresistant that can be used effectively for treatment, if used in combination.

In certain embodiments, this disclosure relates to methods of diagnosing and treating a microbial or bacterial infection comprising: obtaining a sample from a subject at risk of, exhibiting symptoms of, or diagnosed with a bacterial of microbial infection; growing bacteria or microbe in the sample providing a purified microbial or bacterial culture; contacting the microbial or bacterial culture with a library of antibiotic agents or antimicrobial agents; determining that two antibiotics to anti-microbials in the library are heteroresistant; and administering to the subject an effective amount of a combination of the two antibiotics or two anti-microbials for treatment.

In certain embodiments, this disclosure relates to methods of diagnosing subject as susceptible a microbial or bacterial combination therapy comprising: obtaining a sample from a subject at risk of, exhibiting symptoms of, or diagnosed with a bacterial of microbial infection; growing bacteria or microbe in the sample providing a purified microbial or bacterial culture; contacting the microbial or bacterial culture with antibiotics or antimicrobial agents; determining that two or more antibiotics or two or more anti-microbials are heteroresistant; and diagnosing the subject as susceptible to a combination of the two antibiotics or two anti-microbials for treatment. In certain embodiments, the methods further comprise administering an effective amount of the combination of agents to the subject.

In certain embodiments, this disclosure relates to methods of diagnosing subject as susceptible a microbial or bacterial combination therapy comprising: obtaining a sample from a subject at risk of, exhibiting symptoms of, or diagnosed with a bacterial of microbial infection; growing bacteria or microbe in the sample providing a purified microbial or bacterial culture; contacting the microbial or bacterial culture with a library of antibiotic or library of antimicrobial agents; determining that two antibiotics or two anti-microbials in the library are heteroresistant; and diagnosing the subject as susceptible to a combination of the two antibiotics or two anti-microbials for treatment. In certain embodiments, the methods further comprise administering an effective amount of the combination of agents to the subject.

In certain embodiments, this disclosure contemplates methods disclosed herein when a bacterial strain is classified as resistant and/or heteroresistant to all antibiotics in a test library. In certain embodiments, methods disclose herein can be used even when there are a small number of drugs, such as one, two, or three drugs to which a bacterial strain has been classified as susceptible.

In certain embodiments, this disclosure contemplates methods of diagnosing and treating a bacterial infection comprising: obtaining a sample from a subject at risk of, exhibiting symptoms of, or diagnosed with a bacterial infection; growing bacteria in the sample providing a purified bacterial culture; contacting the bacterial culture with a library of antibiotic agents; determining whether the bacterial culture for each antibiotic in the library is either, i) resistant, ii) heteroresistant, or iii) susceptible; and administering to the subject an effective amount of a combination of antibiotics for treatment, wherein each antibiotic in the combination of antibiotics for treatment is determined by the bacterial culture to be heteroresistant in the library.

In certain embodiments, the library of antibiotic agents or microbial agents is greater than 5, 6, 7, 8, 9, or 10 agents. In certain embodiments, the library of antibiotic agents or microbial agents is greater than 11, 15, 20, or 25 agents. In certain embodiments, the library of antibiotic agents or microbial agents is greater than 30, 40, or 50 agents.

In certain embodiments, none of the antibiotics for treatment are determined to be by the bacterial culture susceptible without heteroresistance to the antibiotic in the library.

In certain embodiments, the library of antibiotics comprises colistin, fosfomycin, ceftazidime, ampicillin, amikacin, gentamicin, tobramycin, aztreonam, cefazolin, cefepime, ciprofloxacin, meropenem, piperacillin, tazobactam, tetracycline, tigecycline, trimethoprim, and/or sulfamethoxazole.

In certain embodiments, the subject is diagnosed with a carbapenem-resistant Enterobacteriaceae bacteria. In certain embodiments, the subject is diagnosed with *Enterobacter* spp., *Klebsiella* spp., and *Escherichia* spp of bacteria. In certain embodiments, the subject is a transplant recipient, on a chemotherapy regiment, or is a premature infant. In certain embodiments, subject is diagnosed with bacteremia, surgical infections, or pneumonia.

In certain embodiments, this disclosure relates to methods of diagnosing and treating a bacterial infection comprising: obtaining a sample from a subject at risk of, exhibiting symptoms of, or diagnosed with a bacterial infection; growing bacteria in the sample providing a purified bacterial culture; contacting the bacterial culture with a library of individual antibiotic agents or individual combination of antibiotic agents; determining whether the bacterial culture for each individual antibiotic or individual combination in the library is either, i) resistant by the bacterial culture to the individual antibiotic or individual combination, ii) heteroresistant by the bacterial culture to the individual antibiotic or individual combination, or iii) susceptible by the bacterial culture to the individual antibiotic or individual combination; and administering to the subject an effective amount of a combination of antibiotics for treatment, wherein each individual antibiotic in the combination of antibiotics for treatment is determined to be heteroresistant by the bacterial culture in the library, and/or wherein each individual combination of antibiotics in the combination of antibiotics for treatment is determined to be heteroresistant by the bacterial culture in the library.

In certain embodiments, none of the individual antibiotics or individual combination of antibiotics for treatment are determined to be susceptible by the bacterial culture as an individual antibiotic or as an individual combination by the bacterial culture in the library.

In certain embodiments, each individual antibiotic in the combination of antibiotics for treatment and each individual combination of antibiotics in the combination of antibiotics for treatment are determined to be heteroresistant by the bacterial culture to different antibiotics in the library.

In certain embodiments, each individual antibiotic in the combination of antibiotics for treatment and each individual combination of antibiotics in the combination of antibiotics for treatment are not determined to be heteroresistant by the bacterial culture to the same antibiotic or combination of antibiotics in the library.

In certain embodiments, this disclosure relates to methods of diagnosing and treating a bacterial infection comprising: obtaining a sample from a subject at risk of, exhibiting symptoms of, or diagnosed with a bacterial infection; growing bacteria in the sample providing a purified bacterial culture; contacting the bacterial culture with a library of individual antibiotic agents or combination of antibiotic agents; determining whether the bacterial culture for each individual antibiotic or individual combination in the library is either, i) resistant by the bacterial culture to the individual antibiotic or individual combination, ii) heteroresistant by the bacterial culture to the individual antibiotic or individual combination, or iii) susceptible without heteroresistance by the bacterial culture to the individual antibiotic or individual combination; and administering to the subject an effective amount of a combination of antibiotics for treatment, wherein each individual antibiotic is determined to be heteroresistant by the bacterial culture as an individual antibiotic by bacterial culture or each individual combination of antibiotics is determined to be heteroresistant by bacterial culture as an individual combination of antibiotics.

In certain embodiments, for any of the methods disclosed herein none of the individual antibiotic agents or individual combination of antibiotic agents in the library are determined to be susceptible without heteroresistance by the bacterial culture to the individual antibiotic or individual combination.

In certain embodiments, this disclosure relates to methods of diagnosing and treating a bacterial infection comprising: obtaining a sample from a subject at risk of, exhibiting symptoms of, or diagnosed with a bacterial infection; growing bacteria in the sample providing a purified bacterial culture; contacting the bacterial culture with a library of individual antibiotic agents; determining whether the bacterial culture for each individual antibiotic in the library is either, i) resistant by the bacterial culture to the individual antibiotic, ii) heteroresistant by the bacterial culture to the individual antibiotic, or iii) susceptible without heteroresistance by the bacterial culture to the individual antibiotic; and administering to the subject an effective amount of a combination of antibiotics, wherein each individual antibiotic in the combination of antibiotics is determined to be heteroresistant by the bacterial culture as an individual antibiotic by the bacterial culture.

In certain embodiments, this disclosure relates to methods of diagnosing and treating a bacterial infection comprising: obtaining a sample from a subject at risk of, exhibiting symptoms of, or diagnosed with a bacterial infection; growing bacteria in the sample providing a purified bacterial culture; contacting the bacterial culture with a library of antibiotic agents in combination; determining whether the bacterial culture for a combination of antibiotic agents is either, i) resistant by the bacterial culture to the combination of antibiotic agents, ii) heteroresistant by the bacterial culture to the combination of antibiotic agents, or, iii) susceptible without heteroresistance by the bacterial culture to the combination of antibiotic agents; and administering to the subject an effective amount of antibiotic combinations, wherein the antibiotic combinations are determined to be susceptible without heteroresistance by the bacterial culture and/or the antibiotic agents in combination are determined to be heteroresistant by the bacterial culture.

In certain embodiments, this disclosure contemplates determining heteroresistance in the absence of a culture by diagnostics that works directly on blood or other patient samples, a culture-independent diagnostic. Thus, in certain embodiments, this disclosure provides to identify/find heteroresistance directly on a blood sample without any culturing of the bacteria. In certain embodiments, this disclosure provides for any of the methods disclosed herein wherein no bacterial growth is performed.

In certain embodiments, this disclosure contemplates methods disclosed herein wherein each individual antibiotic in the combination of antibiotics is heteroresistant by the bacterial culture as an individual antibiotic by the bacterial culture.

In certain embodiments, this disclosure contemplates methods disclosed herein, wherein the individual antibiotic is, but not limited to, colistin, fosfomycin, ceftazidime, ampicillin, amikacin, gentamicin, tobramycin, aztreonam, cefazolin, cefepime, ciprofloxacin, meropenem, piperacillin, tazobactam, tetracycline, tigecycline, trimethoprim, and/or sulfamethoxazole.

In certain embodiments, this disclosure contemplates methods disclosed herein, wherein it is determined that the combination of antibiotics comprises two or more antibiotics, but not limited, to, those selected from colistin, fosfomycin, ceftazidime, ampicillin, amikacin, gentamicin, tobramycin, aztreonam, cefazolin, cefepime, ciprofloxacin, meropenem, piperacillin, tazobactam, tetracycline, tigecycline, trimethoprim, and/or sulfamethoxazole.

In certain embodiments, this disclosure contemplates methods disclosed herein, wherein the library of a combination of antibiotic agents comprises, but not limited to, colistin, fosfomycin, ceftazidime, ampicillin, amikacin, gentamicin, tobramycin, aztreonam, cefazolin, cefepime, ciprofloxacin, meropenem, piperacillin, tazobactam, tetracycline, tigecycline, trimethoprim, and/or sulfamethoxazole.

In certain embodiments, this disclosure contemplates methods disclosed herein wherein the subject is diagnosed with a carbapenem-resistant Enterobacteriaceae bacteria. In certain embodiments, this disclosure contemplates methods disclosed herein wherein the subject is diagnosed with *Enterobacter* spp., *Klebsiella* spp., and *Escherichia* spp. of bacteria. In certain embodiments, the subject is a transplant recipient, on a chemotherapy regiment, or is a premature infant. In certain embodiments, the subject is diagnosed with bacteremia, surgical infections, or pneumonia.

In certain embodiments, this disclosure relates to methods of diagnosing and treating a bacterial infection comprising: obtaining a sample from a subject at risk of, exhibiting symptoms of, or diagnosed with a bacterial infection; growing bacteria in the sample providing a purified bacterial culture; contacting the bacterial culture with a library of individual antibiotic agents; determining whether the bacterial culture for each individual antibiotic in the library is either, i) resistant by the bacterial culture to the individual antibiotic, ii) heteroresistant by the bacterial culture to the individual antibiotic, or iii) susceptible without heteroresistance by the bacterial culture to the individual antibiotic; contacting the bacterial culture with a library of a combination of antibiotic agents; determining whether the bacterial culture for a combination of antibiotic agents is either, i) resistant by the bacterial culture to the combination of antibiotic agents, ii) heteroresistant by the bacterial culture to the combination of antibiotic agents, or, iii) susceptible without heteroresistance by the bacterial culture to the combination of antibiotic agents; and administering to the subject an effective amount of a single antibiotic, wherein the individual antibiotic is determined to be susceptible without heteroresistance by the bacterial culture, and/or administering to the subject an effective amount of a combination of antibiotics, wherein the combination of antibiotics is determined to be heteroresistant by the bacterial culture, wherein the combination is further administered with another antibiotic that is heteroresistant by the bacterial culture, and/or administering to the subject a combination of antibiotics, wherein the combination of antibiotics is determined to be heteroresistant by the bacterial culture, and wherein each individual antibiotic in the combination of antibiotics is heteroresistant by the bacterial culture as an individual antibiotic.

In certain embodiments, this disclosure contemplates methods of diagnosing and treating a microbial infection comprising: obtaining a sample from a subject at risk of, exhibiting symptoms of, or diagnosed with a microbial infection; growing microbes in the sample providing a purified microbial culture; contacting the microbial culture with a library of antimicrobial agents; determining whether the microbial culture for each antibiotic in the library is either, i) resistant, ii) heteroresistant, or iii) susceptible; and administering to the subject an effective amount of a combination of antimicrobials for treatment, wherein each antimicrobial in the combination of antimicrobial for treatment is determined by the microbial culture to be heteroresistant in the library.

In certain embodiments, this disclosure relates to methods of diagnosing and treating a microbial infection comprising: obtaining a sample from a subject at risk of, exhibiting symptoms of, or diagnosed with a microbial infection; growing microbes in the sample providing a purified microbial culture; contacting the microbial culture with a library of individual antimicrobial agents or combination of antimicrobial agents; determining whether the microbial culture for each individual antimicrobial or individual combination in the library is either, i) resistant by the microbial culture to the individual antimicrobial or individual combination, ii) heteroresistant by the microbial culture to the individual antimicrobial or individual combination of antimicrobials, or iii) susceptible without heteroresistance by the microbial culture to the individual antimicrobial or individual combination of antimicrobials; and administering to the subject an effective amount of a combination of antimicrobials for treatment, wherein each individual antimicrobial in the combination of antimicrobials for treatment is determined to be heteroresistant by the microbial culture in the library, and/or wherein each individual combination of antimicrobials in the combination of antimicrobials for treatment is determined to be heteroresistant by the microbial culture in the library.

In certain embodiments, none of the individual antimicrobial or individual combination of antimicrobials for treatment are determined to be susceptible as an individual antimicrobial or as an individual combination by the culture in the library.

In certain embodiments, each individual antimicrobial in the combination of antimicrobials for treatment and each individual combination of antimicrobials in the combination of antimicrobials for treatment are determined to be heteroresistant to different antimicrobials in the library.

In certain embodiments, each individual antimicrobial in the combination of antimicrobials for treatment and each individual combination of antimicrobials in the combination of antimicrobials for treatment are not determined to be heteroresistant to the same antimicrobial or same combination of antimicrobials in the library. In certain embodiments, this disclosure contemplates the above method, wherein the microbe is bacteria, fungi, or yeast.

In certain embodiments, a combination antibiotics or antimicrobials could be of the same class, or of different classes. In certain embodiments, a resistant subpopulation that resists one drug, not be the same resistant subpopulation to the other drug in the same class. In certain embodiments, a strain is heteroresistant to colistin, a polymyxin, and the second drug in the combination not be selected as heteroresistant by the culture to a structurally different polymyxin, instead a drug of a different class which is heteroresistant by the culture.

In certain embodiments, bacteria or microbes can be heteroresistant to the individual antibiotics in a combination. In certain embodiments, the bacteria or microbes are susceptible to the combination, even if they were heteroresistant to the individual drugs in the combination. In certain embodiments, the bacteria or microbes are heteroresistant to the combination as well. In certain embodiments, bacteria or microbes with a combination are treated, but there could be an unobserved amount remaining provided the amount of killing could be enough to achieve clinical success. In certain embodiments, treating bacteria or microbes with a combination do not totally eradicate the bacteria or microbes. In certain embodiments, bacteria or microbes are still heteroresistant to the combination provided the amount of killing could be enough to achieve clinical success.

In certain embodiments, this disclosure relates to compositions and methods useful for determining whether a subject will be responsive to an antimicrobial therapy. In certain embodiments, the disclosure contemplates methods of evaluating a sample suspected of containing a microbe for determining whether the sample contains antimicrobial-resistant subpopulations by observing the growth of antimicrobial-resistant subpopulations within a population of the microbe that are killed by the antimicrobial. In certain embodiments, the disclosure relates to a liquid or solid media comprising agar or other matrix material for growing the antimicrobial-resistant subpopulations.

In certain embodiments, the disclosure contemplates methods of determining whether a subject will be responsive to an antimicrobial or antibiotic treatment comprising: obtaining a sample from a subject suspected of having a microbial or bacterial infection; growing the microbe or bacteria from the sample on a solid support comprising agar or other matrix material such that the bacteria grows on a surface area of the agar or solid support; applying an antimicrobial or antibiotic on a location within the surface area, e.g., could be on the surface or in some cases within the agar; and determining whether the sample contains resistant subpopulations by observing the growth of microbial-resistant subpopulations within a population of bacteria that are killed by the antimicrobial or antibiotic, wherein if the anti-microbial or antibiotic-resistant subpopulations are observed, then the subject will not respond to the test antimicrobial or antibiotic, e.g., because subpopulations are not killed and survive to provide a major population even though the initial major population are killed and decline, and wherein if the antimicrobial or antibiotic-resistant subpopulations are not observed, then the subject will respond to the test antimicrobial or antibiotic, e.g., the bacteria and subpopulations are killed and then the health of the subject improves.

In certain embodiments, this disclosure relates to methods of determining whether a subject will be responsive to an antimicrobial or antibiotic treatment comprising: obtaining a sample from a subject suspected of having a microbial or bacterial infection; growing microbe or bacteria from the sample in a liquid comprising an antimicrobial or antibiotic such that the microbe or bacteria grows in the liquid; determining whether the sample contains antimicrobial or antibiotic-resistant subpopulations by observing the growth of antimicrobial or antibiotic-resistant subpopulations within a population of microbes or bacteria that are killed by the antimicrobial or antibiotic, wherein if the antimicrobial or antibiotic-resistant subpopulations are observed, then the subject will not respond to the test antimicrobial or antibiotic, and wherein if the antimicrobial or antibiotic-resistant subpopulations are not observed, then the subject will respond to the test antimicrobial or antibiotic.

In certain embodiments, the disclosure contemplates methods of treating a subject for a microbial or bacterial infection comprising: obtaining a sample from a subject suspected of having a microbial or bacterial infection; growing the microbe or bacteria from the sample on a solid support comprising agar or other matrix material such that the microbe or bacteria grows on a surface area of the agar or matrix material; applying an antimicrobial or antibiotic on a location within the surface area; and determining whether the sample contains antimicrobial or antibiotic-resistant subpopulations by observing the growth of antimicrobial or antibiotic-resistant subpopulations within a population of the microbe or bacteria that are killed by the antimicrobial or antibiotic, wherein if the antimicrobial or antibiotic-resistant subpopulations are observed, then the subject will not respond to the test antimicrobial or antibiotic, and wherein if the antimicrobial or antibiotic-resistant subpopulations are not observed, then the subject will respond to the test antimicrobial or antibiotic; and administering an effective amount of the antimicrobial or antibiotic to the subject if the antimicrobial or antibiotic-resistant subpopulations are not observed.

In certain embodiments, this disclosure relates to methods of treating a subject for a microbial or bacterial infection comprising: obtaining a sample from a subject suspected of having a microbial or bacterial infection; growing the microbe or bacteria from the sample in a liquid comprising an antimicrobial or antibiotic such that the microbe or bacteria grows in the liquid; determining whether the sample contains antimicrobial or antibiotic-resistant subpopulations by observing the growth of antimicrobial or antibiotic-resistant subpopulations within a population of bacteria that are killed by the antimicrobial or antibiotic, wherein if the antimicrobial or antibiotic-resistant subpopulations are observed, then the subject will not respond to the test antimicrobial or antibiotic, and wherein if the antimicrobial or antibiotic-resistant subpopulations are not observed, then the subject will respond to the test antimicrobial or antibiotic; and administering an effective amount of the antimicrobial or antibiotic to the subject if the antimicrobial or antibiotic-resistant subpopulations are not observed.

In certain embodiments, this disclosure relates to methods of treating a subject for a bacterial infection comprising: obtaining a sample from a subject suspected of having a bacterial infection; growing bacteria from the sample on an agar plate comprising such that the bacteria grows on a surface area of the agar plate; applying polymyxin on a location within the surface area; and determining whether the sample contains polymyxin-resistant subpopulations by observing the growth of polymyxin-resistant subpopulations within a population of bacteria that are killed by polymyxin, wherein if the polymyxin-resistant subpopulations are observed the subject will not respond to polymyxin, and wherein if the polymyxin-resistant subpopulations are not observed the subject will respond to the polymyxin; and administering an effective amount of the polymyxin to the subject if the polymyxin-resistant subpopulations are not observed.

In certain embodiments, this disclosure relates to methods of treating a subject for a bacterial infection comprising: obtaining a sample from a subject suspected of having a bacterial infection; growing bacteria from the sample in a liquid comprising polymyxin such that the bacteria grows in the liquid; determining whether the sample contains polymyxin-resistant subpopulations by observing the growth of polymyxin-resistant subpopulations within a population of bacteria that are killed by polymyxin, wherein if the polymyxin-resistant subpopulations are observed the subject will not respond to the polymyxin, and wherein if the polymyxin-resistant subpopulations are not observed the subject will respond to the polymyxin; and administering an effective amount of the polymyxin to the subject if the polymyxin-resistant subpopulations are not observed.

In certain embodiments, the disclosure relates to a liquid or solid media comprising agar for growing the antimicrobial or antibiotic-resistant subpopulations comprising; a cellular extract, vitamins, or a combination; exogenously added amino acids. In certain embodiments, the media comprises an antibiotic. In certain embodiments, the antibiotic is a polymyxin antibiotic or derivative thereof, or a cationic antimicrobial peptide other than a polymyxin, or another cationic antimicrobial such as an aminoglycoside. In certain embodiments, the antibiotic may be a combination of antibiotics. In certain embodiments, the antibiotic or a polymyxin or other antibiotic are in the media or not. In certain embodiments, the antibiotic could be added into or on top of the media.

In certain embodiments, the media could be in different solid or liquid forms. In certain embodiments, the media could be desiccated. In certain embodiments, the media can be used in an automated liquid culture system.

In certain embodiments, colistin (polymyxin E) and polymyxin B could be added to the solid media. In certain embodiments, a solid media could be made without colistin (polymyxin E) and polymyxin B, and a solution of the antibiotics spread on top of the media. In certain embodiments, an Etest for having antibiotics placed is on top of the media, or a disk with antibiotics placed on top of the media.

In certain embodiment, for a liquid media, an antibiotic is added to the media, and the media having the antibiotic may be desiccated.

In certain embodiments, the cellular extract is a yeast extract or beef extract. In certain embodiments, the cellular extract is dehydrated. In certain embodiments, the media is a solid and the exogenously added amino acids are casamino acids. In certain embodiments, media is a liquid and the exogenously added amino acids are casamino acids.

In certain embodiments, the growth media further comprises an antibiotic. In certain embodiments, the media comprises an antibiotic at a concentration of greater than 1, 2, 3, 4, 5, 6, 7, 8, 9, 10, 11, 12, 13, 14, or 15 micrograms per mL. In certain embodiments, the growth media further comprises a buffering agent present in an amount sufficient to provide an initial pH from about 6.5 to 7.0.

In certain embodiments, the microbial agent being tested for resistance is a member of the Enterobacteriaceae, *Enterobacter* species including *Enterobacter cloacae*, *Klebsiella* species including *Klebsiella pneumoniae*, *Pseudomonas* species including *Pseudomonas aeruginosa*, *Escherichia coli*, or bacteria that have a histidine kinase phoQ gene and/or the histidine kinase pmrB gene.

In certain embodiments, this disclosure contemplates for any of the methods disclosed herein, when there are no antibiotics to which a strain of bacteria is susceptible (meaning 100% of the bacterial cells are susceptible and there is no heteroresistance), combination of two antibiotics to which the strain is heteroresistant can be an effective treatment. In certain embodiments, this therapy can be used even if there are antibiotics or combination to which the strain is susceptible. For example, one may want to choose the antibiotic or combination to which the strain is 100% susceptible, patients can have allergies, some antibiotics damage kidneys which would be bad in kidney failure patients, etc. Thus, there are logical examples of when you would potentially choose combination therapy with two or more drugs that target heteroresistance, even if a strain is susceptible to other antibiotics.

In certain embodiments, this disclosure contemplates combining a drug to which a strain is 100% susceptible, with one or more antibiotics to which the strain is heteroresistant. Bacteria can quickly develop resistance to certain drugs. Monotherapy with those drugs is therefore risky. By combining with one or more antibiotics to which the bacteria are heteroresistant, one may be able to avoid the development of resistance to the first drug to which 100% of cells are susceptible.

In certain embodiments, this disclosure contemplates methods disclosed herein to all bacteria, not only Gram-negatives or CRE. In certain embodiments, this disclosure contemplates methods disclosed herein apply to all antibiotics or antimicrobials.

In certain embodiments, this disclosure contemplates methods disclosed herein choosing combinations including two or more antibiotics to which a strain is heteroresistant and select those against which the strain has the lowest frequency resistant subpopulation. When a strain is heteroresistant to a given drug, the frequency of the resistant subpopulation may vary, e.g., from 1 in 10 to 1 in 1 million. If you target the one in 10 with an antibiotic, you would kill 90% of cells (9 in 10). If you use the antibiotic to which the resistant subpopulation is present at 1 in a million, you would kill 99.999% of the individual cells in the population. Thus, in certain embodiments, it is contemplated that when choosing the antibiotics to include in a combination, it is preferable to choose those against which the strain has the lowest frequency resistant subpopulation, so you get the most effect for your antibiotic.

Antibiotic Combinations that Exploit Heteroresistance to Multiple Drugs Effectively Control Infection A carbapenem-resistant enterobacteriaceae (CRE) surveillance collection was screened for heteroresistance to 16 antibiotics, revealing that multiple heteroresistance is highly prevalent (88.5%; FIG. 2B). The prevalence would likely be even higher if all clinically employed antibiotics were tested. The data suggest that combination antibiotic regimens targeted to exploit multiple heteroresistance could be applied to a large proportion of CRE. Highlighting the utility of this approach, cultures of two CRE isolates classified as pan-drug resistant were sterilized by different custom antibiotic combinations targeting multiple heteroresistance (FIGS. 5E-H). Importantly, this strategy employs existing, clinically approved antibiotics and would therefore avoid the lengthy regulatory process required for new drugs, if it were potentially implemented to combat pan-resistant infections.

Figure 3A:
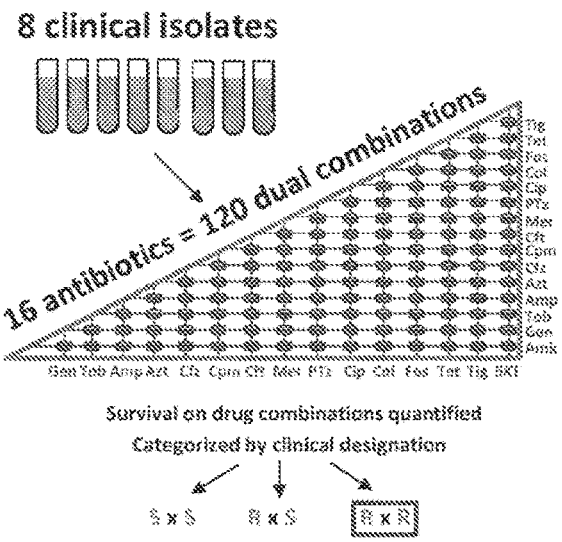
FIGS. 3A-F shows data indicating efficacy of antibiotic combinations is largely dependent on multiple heteroresistance.
Figure 3B:
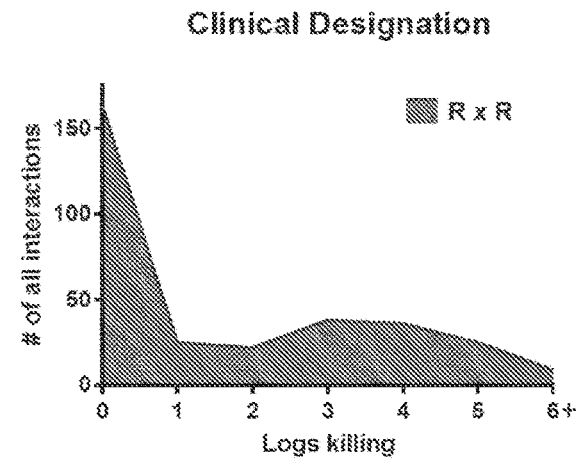
Figure 3C:
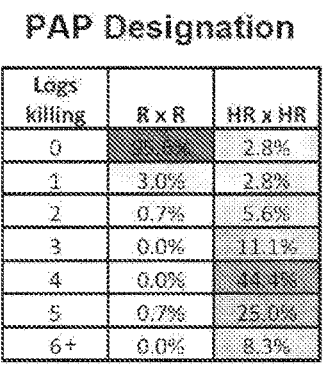
Figure 3D:
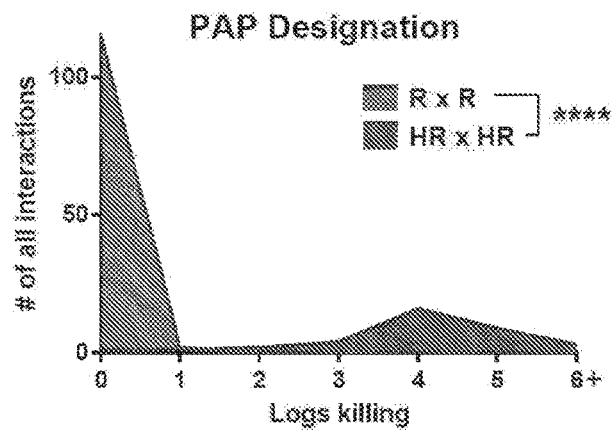

There has not been a clear basis for effective antibiotic combination therapy and some studies have concluded that these regimens are not superior to monotherapy. While the data reported herein indicate that antibiotic combinations to which an isolate exhibits homogenous resistance can be synergistic, this occurs in a small minority of cases (FIG. 3D). Data predict frequent failure of such combination therapies. However, experiments reported herein indicates enhanced efficacy of combinations to which isolates display multiple heteroresistance. Aminoglycoside-beta lactam combinations are frequently used clinically. These are also the classes to which the highest frequencies of heteroresistance was observed (excluding fosfomycin, which was not widely used for decades other than to treat urinary tract infections; FIG. 2A). It is interesting to speculate that the relatively high prevalence of heteroresistance to some aminoglycosides and beta-lactams, and therefore the increased chance that combination therapy with these antibiotics would target multiple heteroresistance, may have been part of the basis by which this combination of classes became favored clinically.

Detection and distinction of heteroresistance may be a critical component of future clinical diagnostics, a capacity that current tests do not have. Such enhanced diagnostic capabilities would prevent the misclassification of heteroresistance as susceptibility, and caution against monotherapy in those cases. Alternatively, rather than designating many instances of heteroresistance as homogenous resistance, and essentially excluding the respective drugs as treatment options, enhanced diagnostics would highlight antibiotics to which isolates are heteroresistant as potential components of combination regimens. In the latter case, quantifying the frequency of the resistant subpopulation in heteroresistance would be critical. This would allow the hierarchical selection of combination regimens that include antibiotics to which the resistant subpopulation is least frequent, thereby facilitating the greatest magnitude of bacterial killing.

Experiments reported herein suggest that targeting multiple heteroresistance provides a predictable rationale to greatly increase the efficacy of combination regimens, representing a paradigm shift in antibiotic therapy.

EXAMPLES

Carbapenem-Resistant *Enterobacteriaceae*

Antibiotic resistance is a major threat to worldwide public health. Multi-drug resistant bacteria have increasingly emerged as a cause of hospital-acquired infections. Polymyxin antibiotics, including colistin and polymyxin B, are increasingly relied on as a last line of treatment for highly antibiotic resistant Gram-negative infections. However, polymyxin-resistant bacterial isolates have also emerged. Further complicating the treatment of some bacterial infections is the unexplained failure of antibiotic therapy against bacterial strains that are classified as susceptible to the antibiotic. Thus, there is a need to generate improved diagnostics for identifying and treating antibiotic-resistant strains.

Antibiotics are critical for the treatment of bacterial infections and their effectiveness is essential to many advances of modern medicine such as transplants, chemotherapy, complex surgeries, and the survival of severely premature infants. Among antibiotic-resistant bacteria, the carbapenem-resistant *Enterobacteriaceae* (CRE; including *Enterobacter* spp., *Klebsiella* spp., and *Escherichia* spp.) have emerged over the last two decades to become an "urgent" public health threat, with a mortality rate of up to 30% for invasive infections. Some isolates of CRE are resistant to all available antibiotics and there is a lack of reliable therapeutic options to treat such infections.

Heteroresistance is widespread among clinical isolates of carbapenem-resistant Enterobacteriaceae (CRE), observed for all sixteen antibiotics tested, including some for which heteroresistance had not previously been described. Over 88% of isolates exhibited heteroresistance to multiple antibiotics. When used in combination, antibiotics targeting heteroresistance led to robust killing, whereas antibiotics targeting homogenous resistance were ineffective. Importantly, two pan-drug resistant *Klebsiella* isolates were eradicated by combinations targeting multiple heteroresistance. These findings highlight a defined and predictable rationale for effective antibiotic combinations using existing, clinically approved drugs.

A clinical isolate of *Enterobacter cloacae* (Mu208) was identified that exhibits heteroresistance to the last-line antibiotic, colistin. Roughly 4 logs of Mu208 cells were killed by a concentration of colistin below the clinical breakpoint, the concentration of an antibiotic at which bacterial growth correlates with clinical resistance, and at which restriction of growth correlates with clinical susceptibility and treatment success. However, a resistant subpopulation survived (FIG. 1A). Population analysis profile (PAP), in which dilutions of bacteria are plated on increasing concentrations of a respective antibiotic, revealed that this colistin resistant subpopulation survived at 4-fold the colistin breakpoint, and had a minimum inhibitory concentration (MIC) at least 32-fold greater than the susceptible cells in the population (FIG. 1A). In contrast, all the cells of a representative susceptible isolate were killed at a concentration of colistin below the breakpoint (FIG. 1A).

Figure 1B:
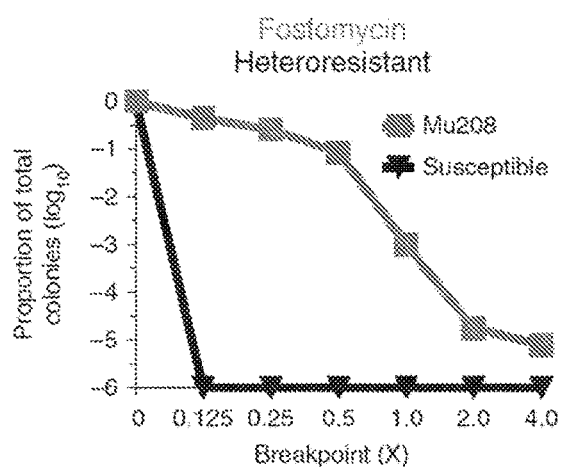
FIG. 1B shows data using fosfomycin.
Figure 1C:
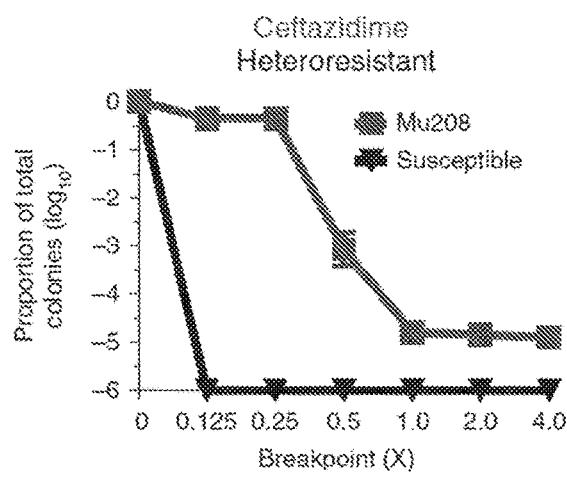
FIG. 1C shows data using ceftazidime.
Figure 1D:
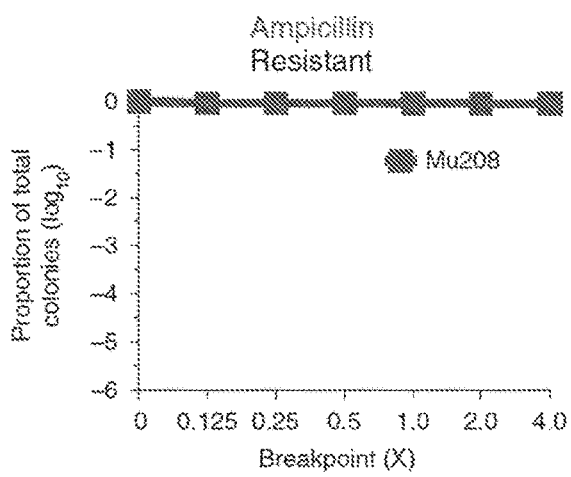
FIG. 1D shows data using ampicillin.

Interestingly, PAPs using other antibiotics indicated that Mu208 also exhibited heteroresistance to antibiotics from distinct classes; ceftazidime (beta-lactam; FIG. 1B) and fosfomycin (FIG. 1C). In this study, heteroresistance (HR) was defining using PAP as the survival of a subpopulation of the cells of an isolate at an antibiotic concentration at least 2-fold above the breakpoint. For both ceftazidime (FIG. 1B) and fosfomycin (FIG. 1C), a resistant subpopulation survived at 4-fold the breakpoint, although the curves indicating survival frequencies at each concentration were distinct and also different compared to that of the colistin resistant subpopulation (FIG. 1A). In contrast, Mu208 displayed homogenous resistance to ampicillin, as indicated by the lack of significant killing of cells at any of the concentrations tested (FIG. 1D). These data demonstrate that Mu208 exhibits heteroresistance to multiple antibiotics, or "multiple heteroresistance".

Figure 1E:
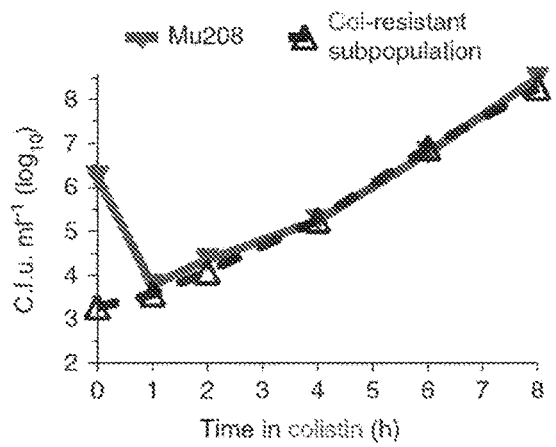
FIG. 1E shows data where Mu208 was treated with colistin (16 µg/ml), at concentrations above its breakpoints to ensure killing of the antibiotic susceptible populations. Bacteria were plated at the indicated timepoints for enumeration of total (solid line) and resistant (dashed line) cells.

A hallmark of heteroresistance is that the resistant subpopulation can expand exponentially in the presence of antibiotic, in contrast to persisters which are a subpopulation of cells that resist antibiotics due to metabolic quiescence leading to very slow or no growth. To determine if the colistin, ceftazidime, or fosfomycin resistant subpopulations were persisters, Mu208 growth kinetics was monitored in the presence of each of these antibiotics (at the breakpoint concentration). After treatment of Mu208 with colistin, the susceptible cells were killed within one hour, while the pre-existing resistant subpopulation survived (FIG. 1E). Subsequently, the resistant subpopulation expanded exponentially, accounting for the regrowth of the bacteria (FIG. 1E). In contrast, a susceptible strain was eradicated by colistin treatment. Similar results were observed for ceftazidime (FIG. 1F) and fosfomycin (FIG. 1G), although the kinetics were different and killing was delayed for the former. Exposure to ampicillin did not lead to the initial reduction in bacterial levels observed with the other antibiotics, consistent with Mu208 exhibiting homogenous resistance to this drug (FIG. 1H). Taken together, these data show that the colistin, ceftazidime, and fosfomycin resistant subpopulations rapidly increased in number in the presence of their respective antibiotic, indicating that they are not persisters, but rather are heteroresistant.

The frequency of the colistin resistant subpopulation returns to baseline when a colistin heteroresistant isolate is removed from colistin-containing media and sub-cultured into antibiotic-free media. Treatment of Mu208 with colistin, ceftazidime, or fosfomycin led to a robust increase in the frequency of the respective resistant subpopulations. Subsequently, upon subculture in the absence of antibiotic, the frequency of each resistant subpopulation returned to the baseline levels observed prior to antibiotic treatment. The frequency of the ampicillin resistant cells, however, was constant in the presence or absence of this drug, consistent with homogenous resistance. The reversible nature of the resistance exhibited by the colistin, ceftazidime, and fosfomycin resistant subpopulations was consistent with heteroresistance and indicated that the outgrowth of each was not due to a stable mutation.

The colistin, ceftazidime, and fosfomycin resistant subpopulations displayed differing PAP curves (FIG. 1A-C) and kinetics of killing and outgrowth (FIG. 1E-G) in the presence of their respective drugs, suggesting that they were independent. Colistin heteroresistance in *Enterobacter* requires the two-component system histidine kinase PhoQ which we deleted from Mu208 to test whether colistin heteroresistance was linked to ceftazidime or fosfomycin heteroresistance. While the colistin resistant subpopulation was absent in the phoQ mutant, the frequencies of the ceftazidime and fosfomycin resistant subpopulations were similar to parental Mu208. These data further suggest that the resistant subpopulations for different antibiotics can be independent from each other in isolates exhibiting multiple heteroresistance.

Figure 1F:
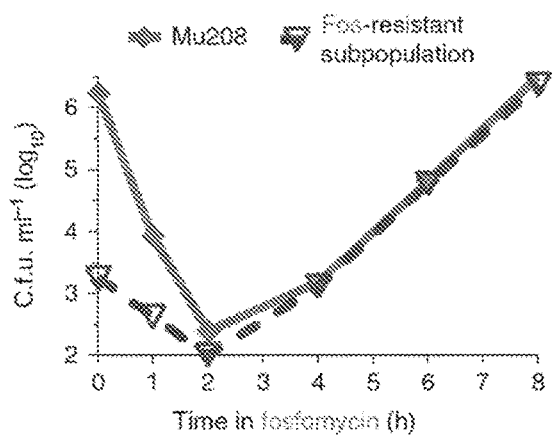
FIG. 1F shows data using ceftazidime (128 µg/ml).
Figure 1G:
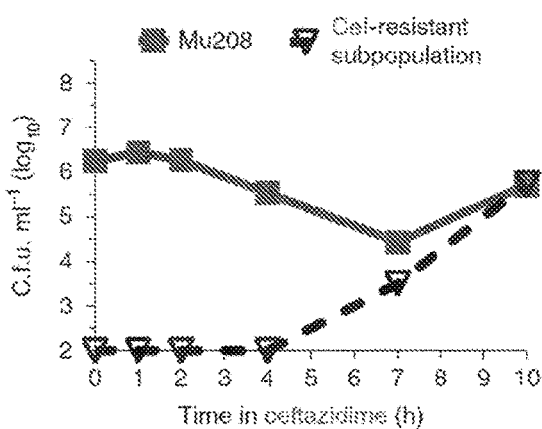
FIG. 1G shows data using fosfomycin (256 µg/ml).
Figure 1H:
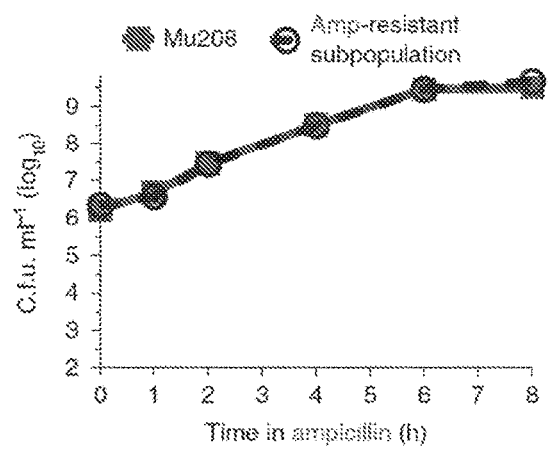
FIG. 1H shows data using ampicillin (128 µg/ml).
Figure 1I:
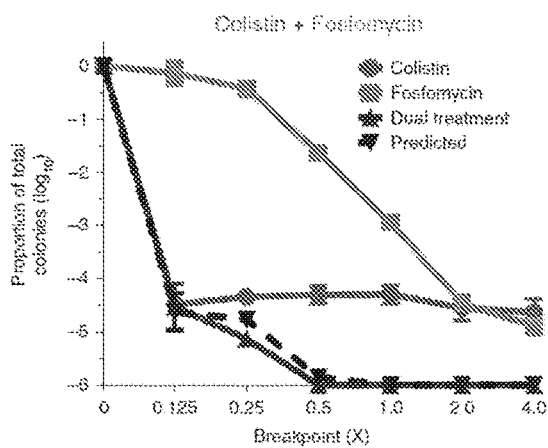
FIG. 1I shows PAPs of Mu208 plated on concentrations of the indicated single antibiotics or two-drug combination of colistin and fosfomycin relative to their breakpoints. The proportion of surviving colonies on single drug PAPs were multiplied to determine predicted additive killing (black dashed line).
Figure 1J:
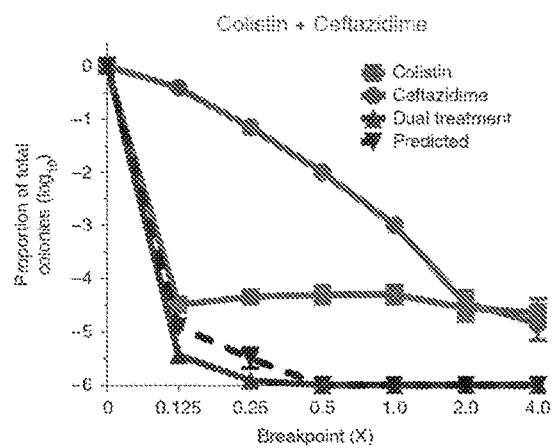
FIG. 1J shows PAPs of Mu208 plated on concentrations of the indicated single antibiotics or two-drug combination of colistin and ceftazidime relative to their breakpoints.
Figure 1K:
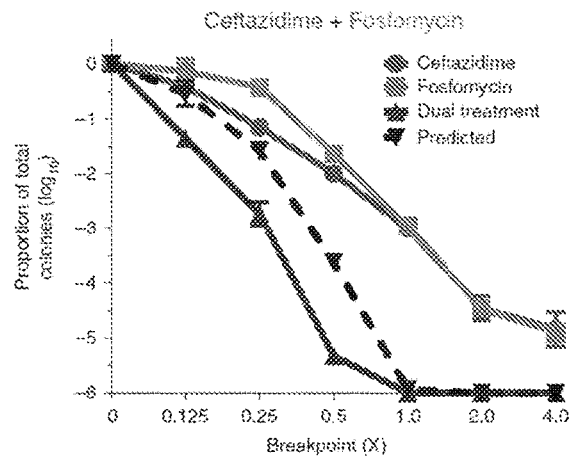
FIG. 1K shows PAPs of Mu208 plated on concentrations of the indicated single antibiotics or two-drug combination of ceftazidime and colistin relative to their breakpoints.
Figures 1L, 1M, 1N:
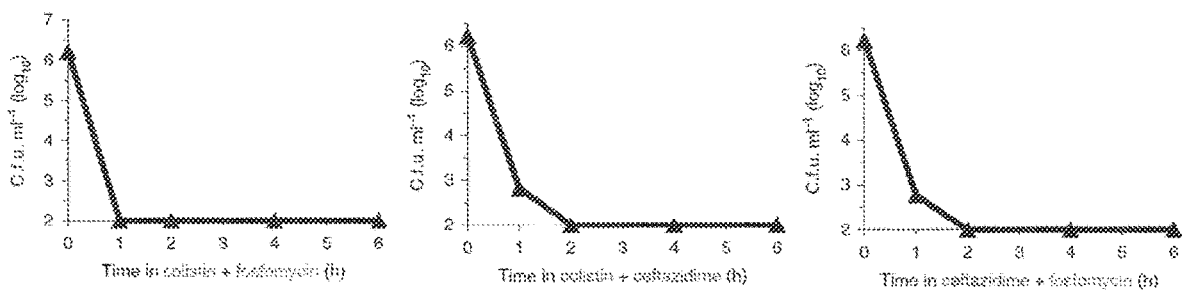
FIG. 1L shows data where Mu208 was treated with a colistin and ceftazidime, combination and plated at the indicated timepoints to enumerate bacterial levels.
FIG. 1M shows data where Mu208 was treated with a colistin and fosfomycin, combination.
FIG. 1N shows data where Mu208 was treated with a ceftazidime and fosfomycin, combination.
Figure 1O:
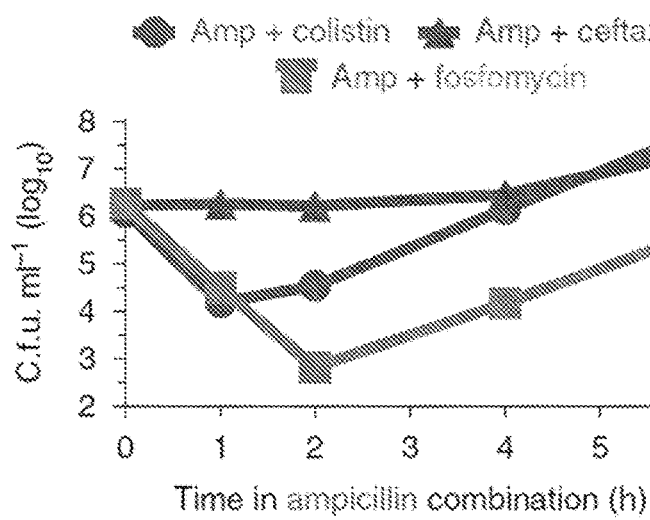
FIG. 1O shows data where Mu208 was treated with a colistin, ceftazidime, or fosfomycin with ampicillin combinations.
Figure 1P:
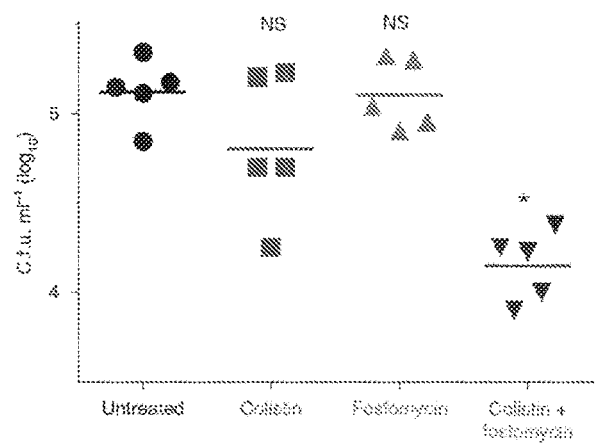
FIG. 1P shows data where mice were infected with Mu208 intraperitoneally and treated with indicated colistin and fosfomycin starting at 4 h post infection. Peritoneal lavage was harvested at 24 h post infection and colony forming units (c.f.u.) were quantified.
Figure 1Q:
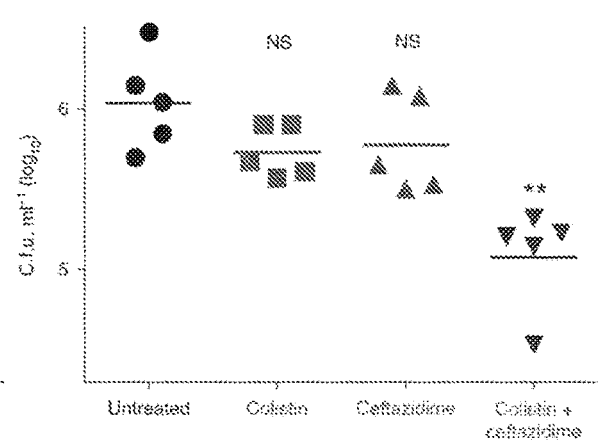
FIG. 1Q shows data where mice were infected with Mu208 intraperitoneally and treated with indicated colistin and ceftazidime.
Figure 1R:
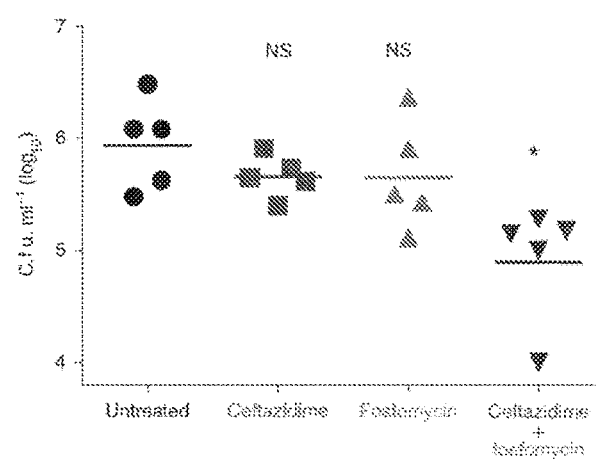

Colistin, ceftazidime, and fosfomycin each kill a large proportion of Mu208 cells but are unable to prevent subsequent outgrowth of the bacteria (FIGS. 1E-G). Since the subpopulations resistant to each antibiotic are at least in some cases independent, combinations of these drugs could lead to killing equal to the product of the magnitudes of killing for each of the individual drugs. Indeed, PAPs with two drugs ("dual PAPs"; using increasing concentrations of two antibiotics, each at the same multiple of their respective breakpoints) demonstrated that the level of killing by each dual antibiotic combination closely matched the magnitude predicted from the individual drug treatments (FIGS. 1I-K). This indicated that killing was additive. The colistin/ceftazidime, colistin/fosfomycin, and ceftazidime/fosfomycin dual drug combinations each killed Mu208 within two hours (FIGS. 1L-N), preventing the outgrowth that was observed with the individual drugs (FIGS. 1E-G). In both the dual PAP (FIGS. 1I-K) and time-kill experiments (FIGS. 1L-N), the activity of colistin, ceftazidime, or fosfomycin was not enhanced by combination with ampicillin. This demonstrated that efficacy correlated with antibiotic combinations involving two drugs to which the isolate exhibited heteroresistance, but that a similar effect was not observed when the isolate was heteroresistant to one drug and homogenously resistant to the other (FIG. 1O). Taken together, these data demonstrate that while monotherapy is ineffective in combating heteroresistance, combinations of antibiotics to which an isolate is heteroresistant can be used effectively.

Multiple Heteroresistance is Prevalent in CRE

It was unclear whether multiple heteroresistance was an infrequent or common phenomenon. Since combination antibiotic regimens are often employed when treating strains that are resistant to most or all available drugs, a collection of clinical isolates of multidrug resistant CRE from the GA EIP's MuGSI surveillance program were interrogated. MuGSI collects isolates in Georgia from 27 labs serving 184 medical facilities and representing a total surveillance population of 4 million people. Antibiotics were tested and assayed for heteroresistance using PAP, investigating a total of 11,648 conditions for the proportion of surviving bacteria. Heteroresistance was observed for each of the antibiotics tested, although the proportion of the isolates exhibiting heteroresistance varied widely for different drugs, ranging from 72.1% for fosfomycin to 1.0% for ampicillin (FIG. 2A). Surprisingly, 97.1% of the isolates were heteroresistant to at least one of the 16 antibiotics, and 88.5% exhibited heteroresistance to at least two drugs (FIG. 2B). These data indicate that heteroresistance is widespread and suggest that combination antibiotic regimens targeting multiple heteroresistance might be applicable to a large proportion of CRE.

Clinical antimicrobial susceptibility testing largely relies on liquid media-based diagnostics that assay for outgrowth of bacteria in the presence of different antibiotics. This approach only classifies isolate/antibiotic pairs as resistant or susceptible, but cannot differentiate heteroresistance. Sixty-four percent of the isolate/antibiotic interactions were classified as resistant by clinical testing and 35.7% as susceptible (FIG. 2C). However, PAP testing revealed that the bacteria exhibited heteroresistance in 22.9% of the interactions (FIG. 2C). Strikingly, 25.3% of the interactions classified as resistant by clinical testing were actually heteroresistance, as well as 18.5% of those classified as susceptible in the clinic (FIG. 2C). When the average of the PAP curves for isolate/antibiotic interactions classified as resistant by clinical testing was plotted, those also designated resistant by PAP were not killed at the breakpoint concentration (FIG. 2D). However, those demonstrated to be heteroresistant by PAP exhibited an average of 2 logs of killing at the breakpoint concentration (FIG. 2D). The average PAP curve for isolates classified as susceptible by clinical testing but heteroresistant by PAP had an average of 4 logs of killing at the breakpoint, while those classified as susceptible by both clinical testing and PAP demonstrated 6 logs of killing at the breakpoint (FIG. 2D). These data reveal that: 1) a significant portion of the isolate/antibiotic interactions currently designated resistant by clinical testing are due to heteroresistance, 2) some heteroresistance is undetected and classified as susceptibility, and 3) detected heteroresistance is on average due to resistant subpopulations with higher frequencies (~1 in 100 cells), whereas undetected heteroresistance is associated with less frequent resistant subpopulations (~1 in 10,000; FIG. 2D).

Efficacy of Antibiotic Combinations Targeting Multiple Heteroresistance.

Since our data indicated that multiple heteroresistance can be exploited by combination therapy (FIGS. 1I-N) and that this phenomenon is highly prevalent among the CRE isolates tested (FIG. 2B), the efficacy of this strategy was investigated in a combination screen using a subset of 8 isolates (3 Enterobacter, 4 Klebsiella, 1 Escherichia) chosen due to the variety of antibiotics to which they exhibit heteroresistance. All 120 distinct combinations of 16 antibiotics were tested by plating the isolates on solid agar containing the breakpoint concentrations of each antibiotic pair (FIG. 3A). Experiments were first directed to combinations composed of two antibiotics to which individual isolates were classified as resistant by clinical testing; in total 90 distinct antibiotic pairs in this category were tested across the 8 isolates, for a total of 313 interactions. Among such isolate/antibiotic interactions, 34.0% led to over 3 logs of bacterial killing (FIG. 3B). When the combinations (classified as resistant by clinical testing) were segregated into those involving two antibiotics to which a given isolate was designated resistant by PAP (R×R), or those to which an isolate was classified as heteroresistant by PAP (HR×HR), less than 1% of the R×R interactions led to 3 logs of killing or more, compared with 88.8% of HR×HR interactions (FIGS. 3C, D). Of the R×R combinations, 95.6% did not cause significant killing and only 4.4% led to 1 log or more of killing (FIGS. 3C, D). In contrast, 97.2% of HR×HR combinations killed one log or more of bacteria and 33.3% killed at least 5 logs (FIGS. 3C, D). When R×HR combinations were analyzed, the observed reduction in bacterial levels very closely mirrored the reduction that occurred when using only the antibiotic from the combination to which the given isolate was heteroresistant. This indicated that the antibiotic within the combination to which an isolate exhibited homogenous resistance did not significantly contribute to the reduction in bacterial levels, similar to the results with Mu208 treated with ampicillin combinations (FIG. 1O). Taken together, these data highlight that antibiotic combinations targeting multiple heteroresistance accounted for the vast majority of robust bacterial killing as compared to those involving drugs to which strains exhibited homogenous resistance.

As expected, antibiotic combinations involving drugs to which an isolate was classified as susceptible by clinical testing were highly effective in reducing bacterial levels. However, among the interactions classified as susceptible by clinical testing, those involving drugs to which an isolate was revealed to be heteroresistant by PAP, were less effective. Comparing all the combinations involving two antibiotics to which an isolate was identified as being heteroresistant by PAP, those that were classified as susceptible by clinical testing led to greater reductions in bacterial levels as compared to those classified as resistant by clinical testing. Among cases in which an isolate was designated heteroresistant to an antibiotic by PAP, those that were classified as susceptible by clinical testing led to an average of 2 logs greater reduction in bacterial levels than those classified as resistant (FIG. 2D).

Figure 3E:
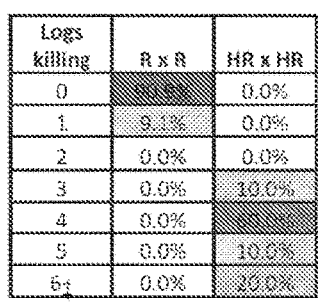
Figure 3F:
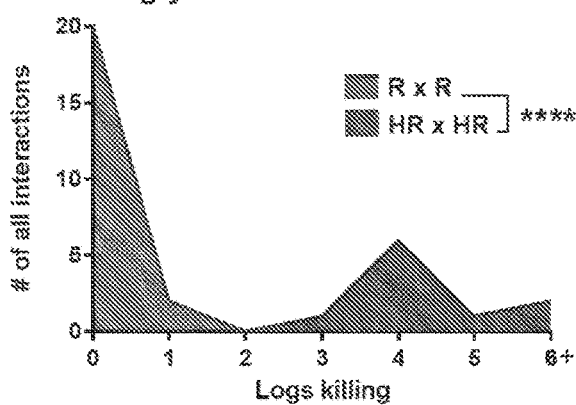

Aminoglycoside/beta-lactam combinations are historically used in combination therapy. The potential role of multiple heteroresistance in their efficacy was examined. the combination screen data for combinations involving one of 3 aminoglycosides (amikacin, gentamicin, tobramycin) and one of 7 beta-lactams (ampicillin, aztreonam, cefazolin, cefepime, ceftazidime, meropenem or the beta-lactam/beta-lactamase inhibitor, piperacillin/tazobactam) was analyzed. Similar to the data including all antibiotics, only 9.1% of R×R combinations reduced bacterial levels by one log (FIGS. 3E, F). In contrast, 90.0% of HR×HR combinations reduced bacterial levels by 4 logs or more (FIGS. 3E, F). Taken together, these data demonstrate that for the isolates tested here, robust reductions in bacterial levels by aminoglycoside/beta-lactam combinations were dependent on targeting multiple heteroresistance.

Checkerboard Synergy is Often Due to Multiple Heteroresistance

One method identifying effective antibiotic combinations is the checkerboard assay and involves growing an isolate in liquid media in increasing concentrations of two drugs, as well as all the respective dosing combination. This assay tests for the efficacy of a combination of two antibiotics that is greater than what would be predicted using the MIC for each drug alone. Such combinations are described as being synergistic when having a fractional inhibitory concentration (FIC) value below 0.5. Experiments were performed to determine how antibiotic combinations targeting multiple heteroresistance would be classified by the checkerboard assay. Mu208 was employed. The three, dual antibiotic combinations involving colistin, ceftazidime, and fosfomycin were tested. All of the combinations had FIC values below 0.5 and were thus classified as synergistic by the checkerboard assay. In contrast, combinations of each of the drugs with ampicillin had FIC values above 0.5 and were not designated as synergistic. These data highlight that antibiotic combinations targeting multiple heteroresistance can be classified as synergistic by the checkerboard assay, although these results can be explained by the additive killing of distinct antibiotic resistant subpopulations (FIGS. 1I-K).

Checkerboard assays were performed on the isolates used in the dual PAP screen, testing all of the combinations that included two drugs to which a respective isolate was classified as resistant by clinical diagnostic testing. Twenty-four percent had a FIC of 0.5 or below and thus were classified as synergistic. However, when segregated into those found to be R×R or HR×HR by PAP, only HR×HR combinations led to FIC scores below 0.5 (53.3% of HR×HR interactions were below FIC=0.5) and were classified as synergistic. These results indicate that for the isolates and antibiotics tested here, R×R combinations were not identified as being synergistic, whereas many HR×HR combinations were. The data further suggest that multiple heteroresistance may explain a significant proportion of antibiotic combinations previously identified as being synergistic.

Figures 4A, 4B, 4C:
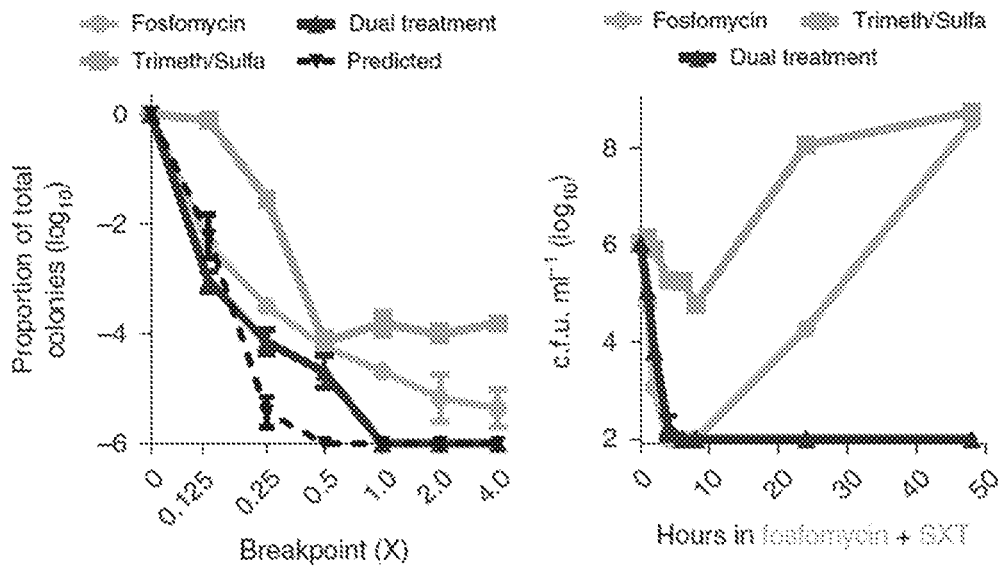
FIGS. 4A-I show data indicating eradication of pan-resistant *Klebsiella* by antibiotic combinations targeting multiple heteroresistance.
Figure 4D:
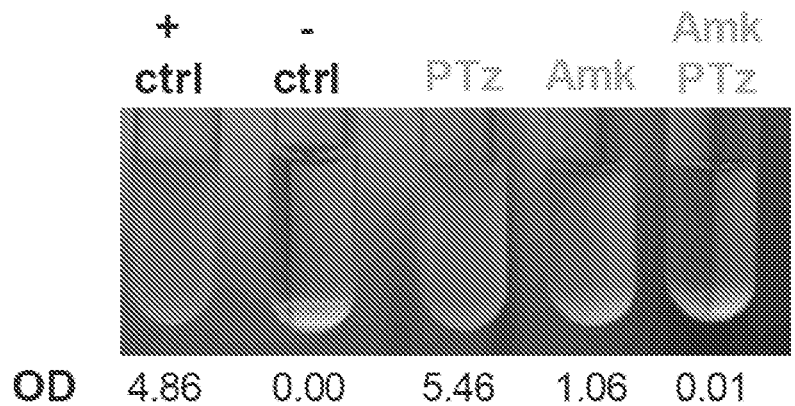
Figure 4E:
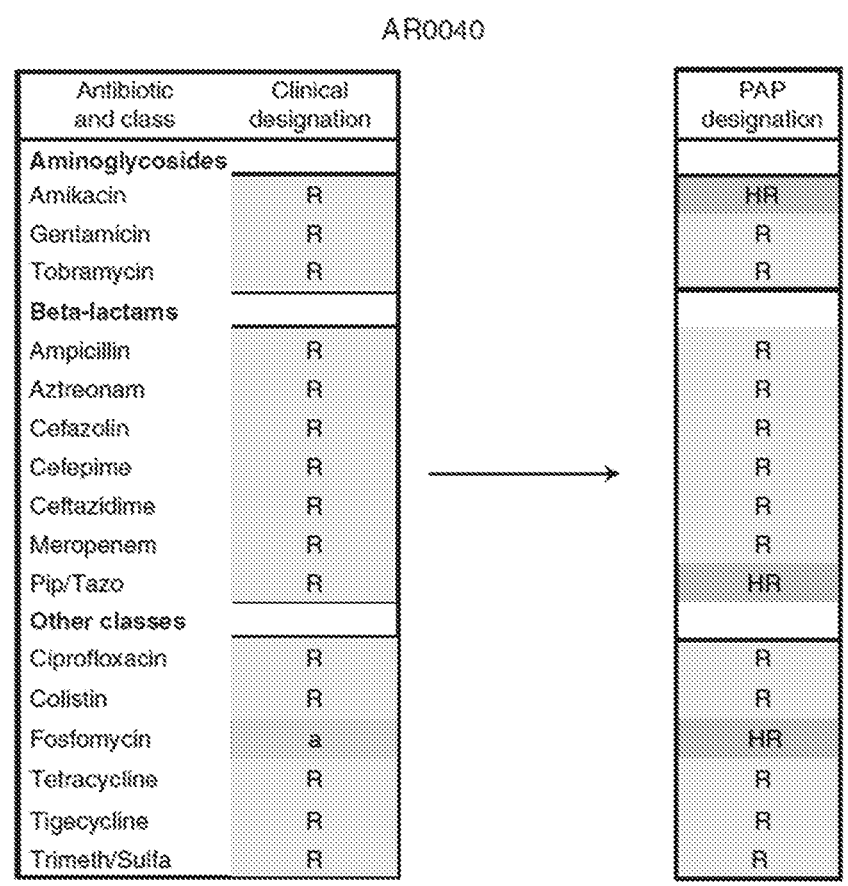
Figure 4F:
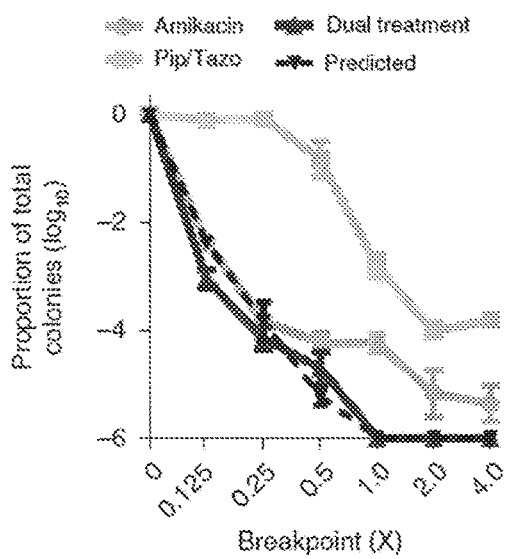
Figure 4G:
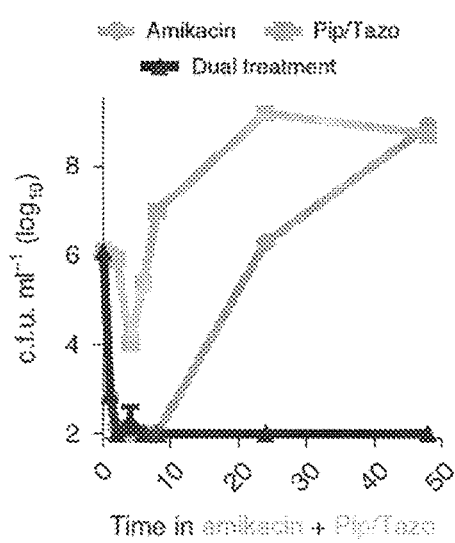
Figure 4H:
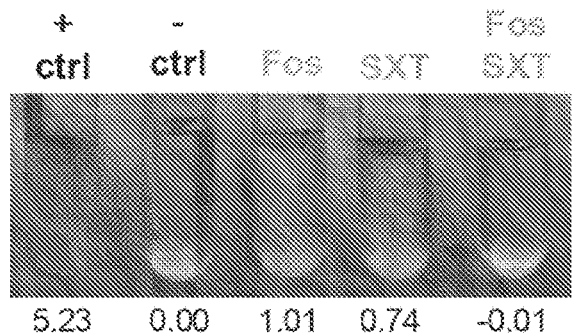
Figure 4I:
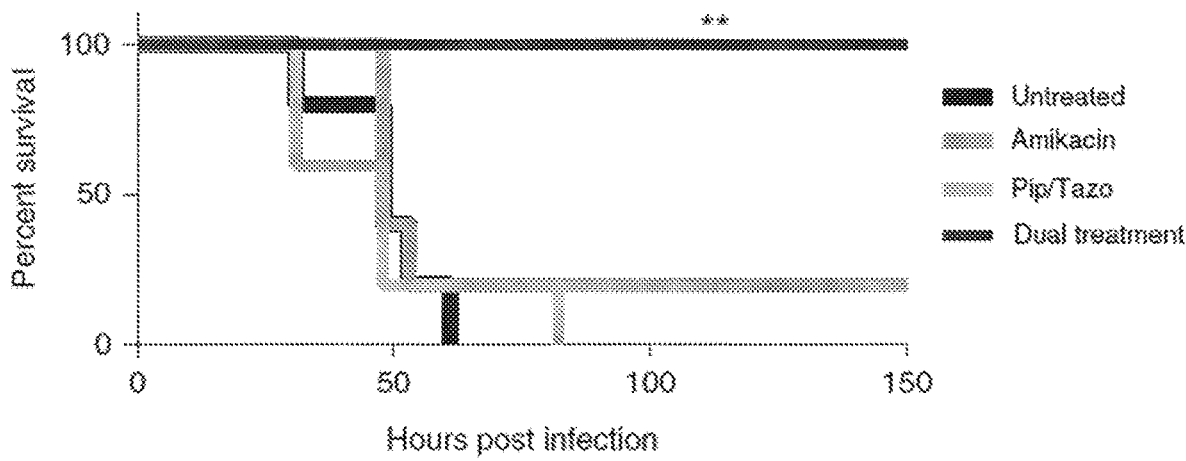

Combinations Targeting Multiple Heteroresistance Eradicate Pan-Resistant Strains To further evaluate the potential utility of combination regimens targeting multiple heteroresistance, this approach was tested against two pan-drug resistant *Klebsiella pneumoniae* isolates (AR0040, and Nevada-2016 which caused a lethal infection). First, each isolate was tested for heteroresistance to 16 antibiotics by PAP. Although it had been classified as resistant to these antibiotics, AR0040 was determined to be heteroresistant to amikacin and piperacillin/tazobactam (FIG. 4A). Dual PAP revealed that amikacin and piperacillin/tazobactam in combination led to additive killing of AR0040 (FIG. 4B). In contrast, the combination of trimethoprim/sulfamethoxazole (SXT) and fosfomycin, to which AR0040 is resistant and heteroresistant, respectively, did not lead to eradication of the bacteria, which was in agreement with findings that targeting multiple heteroresistance is critical to the efficacy of combination regimens. Time-kill experiments were performed which indicated that while amikacin or piperacillin/tazobactam alone led to significant initial killing of AR0040, bacterial outgrowth was observed by 24 hours (FIG. 4C). Only the combination of both drugs killed the bacteria and prevented their outgrowth through 48 hours (FIG. 4D). Similarly, Nevada-2016 was determined to be heteroresistant to fosfomycin and SXT (FIG. 4E). Either of these antibiotics alone led to killing of a significant proportion of the bacteria, but only the combination of both led to eradication of the culture and prevented subsequent outgrowth (FIGS. 4F-H). As a control, the combination of amikacin and piperacillin/tazobactam, to which Nevada-2016 exhibits homogenous resistance and heteroresistance, respectively, did not lead to killing beyond that of piperacillin/tazobactam alone. These data highlight that antibiotic combinations targeting multiple heteroresistance can lead to eradication of isolates deemed pan-resistant by clinical testing and which had been thought to be untreatable.

Materials and Methods

Bacterial isolates. *Enterobacter cloacae* isolate Mu208 was isolated from a urine sample at an Atlanta area hospital. The following isolates were used as controls: Mu1176 (resistant to colistin, ceftazidime, fosfomycin, ampicillin), Mu819 (susceptible to colistin and fosfomycin), Mu712 (susceptible to ceftazidime), and Mu661 (susceptible to ampicillin). Carbapenem-resistant *Enterobacteriaceae* (CRE) were collected between 2013 and 2015 by the Georgia EIP MuGSI. The CDC for provided pan-resistant *Klebsiella pneumoniae* isolates AR0040 and Nevada-2016.

Clinical susceptibility testing. All isolates were tested for their clinical MIC and resistance designation in the clinical microbiology lab at Emory University Hospital. 12 of the 16 drugs were tested by automated Vitek 2 (Biomerieux, Marc'-l'Étoile, France) using the GN74 susceptibility card. Antibiotics that were not on the GN74 panel (colistin, fosfomycin, ampicillin, ciprofloxacin) were tested using the respective Etest gradient strips, as recommended (Biomerieux, Marc'-l'Étoile, France). Susceptibility results were interpreted by a licensed clinical microbiologist.

Bacterial culture. Bacteria were struck onto Mueller Hinton (MH) agar plates from frozen glycerol stocks. Single colonies were inoculated into MH broth and incubated at 250 rpm, 37° C. overnight. Colony forming units (CFU) were determined by serial dilutions of bacteria in phosphate buffered saline (PBS) plated onto MH agar plates at 37° C. CFU were determined at the lowest distinguishable dilution.

Population analysis profile. Population analysis profiles (PAPs) were conducted. Briefly, solid agar plates were made for each antibiotic at 7 concentrations containing 0, 0.125, 0.25, 0.5, 1, 2 and 4 times the breakpoint, using Mueller Hinton agar. Breakpoint concentrations for *Enterobacteriaceae* from CLSI (amikacin 64 ug/mL, gentamicin 16 ug/mL, tobramycin 16 ug/mL, ampicillin 32 ug/mL, aztreonam 16 ug/mL, cefazolin 32 ug/mL, cefepime 16 ug/mL, ceftazidime 16 ug/mL, meropenem 4 ug/mL, piperacillin/tazobactam 128/4 ug/mL, ciprofloxacin 1 ug/mL, fosfomycin 256 ug/mL (breakpoint for UPEC; 25 mg/L glucose-6-phosphate added to the media), tetracycline 16 ug/mL, trimethoprim/sulfamethoxazole 4/76 ug/mL), FDA (tigecycline 8 ug/mL), or EUCAST (colistin 4 ug/mL) were used. Dual PAPs were made similarly, with both drugs in each plate at the same multiple of their respective breakpoint (0, 0.125, 0.25, 0.5, 1, 2, 4 times the breakpoint). Isolates to be tested were grown up overnight in Mueller Hinton broth from a single colony isolated from a frozen stock. Serial microdilutions were plated at each concentration of antibiotic. Colonies were enumerated after overnight growth at 37° C. An isolate was classified as resistant if the number of colonies that grew at the breakpoint concentration were at least 50% of those that grew on antibiotic free plates. If an isolate was not resistant, it was classified as heteroresistant if the number of colonies that grew at 2 or 4 times the breakpoint were at least 0.0001% (1 in $10^6$) of those that grew on antibiotic free plates. If isolates were neither classified as resistant or heteroresistant, they were classified as susceptible.

Time kills. Time kills were conducted. Briefly, $10^6$ CFU/mL bacteria from an overnight culture were inoculated into 2 mL MH media in culture tubes (Globe Scientific) with and without antibiotic(s). The following concentrations were used: colistin 16 µg/mL, ceftazidime 128 µg/mL, fosfomycin 256 µg/mL (+25 mg/L Glucose-6-Phosphate (G6P)), ampicillin 128 µg/mL (FIG. 1*e-h* and Supplementary FIG. 2), fosfomycin 256 µg/mL (+25 mg/L G6P), trimethoprim 4 µg/mL sulfamethoxazole 76 µg/mL, amikacin 64 µg/mL, and piperacillin 256 µg/mL tazobactam 4 µg/mL (FIGS. 5C, D, G, H). Cultures were incubated at 37° C. shaking at 250 RPM for 1-48 hours. CFU were determined by serial diluting bacteria in PBS prior to plating on MH agar plates at various timepoints in the assay (0, 1, 2, 4, 6, 8, 10, 24, and 48 hour timepoints were used for time-kills). In FIG. 1E-H, serially diluted bacteria were also plated on MH agar plates with antibiotic added (colistin 16 µg/mL, ceftazidime128 µg/mL, fosfomycin 256 µg/mL(+25 mg/L G6P), and ampicillin 128 µg/mL). In FIGS. 5D, H culture tubes were imaged with a Canon EOS Rebel T3i.

Antibiotic combination screen. The combination screen (FIG. 3A) included 8 representative isolates (3 *Enterobacter*, 4 *Klebsiella*, 1 *Escherichia*) from the 104 MuGSI CRE isolates tested for heteroresistance (FIGS. 2A, B), chosen due to the variety of antibiotics to which they were classified as heteroresistant. Mueller Hinton agar plates were made using each of the 16 antibiotics at the breakpoint concentrations mentioned above. In addition, all 120 distinct two-drug combinations were tested (FIG. 3A), using the breakpoint concentrations for both drugs. Log killing for each combination was calculated by dividing the enumerated CFU on the two-drug combination plate by the CFU on antibiotic free plates. Each antibiotic combination/isolate interaction was tested in duplicate, and the enumerated CFU on each plate were averaged.

Checkerboard assay. $5*10^5$ CFU bacteria were used to inoculate 100 µL MH in a 96 well plate (Falcon flat bottom tissue culture plate) with and without drug, which was subsequently incubated at 37° C. for 20-24 hours. Breathe-easy sealing membranes (RPI) were amended prior to incubation. Drug was diluted by 1:1 serial diluting antibiotic with fresh media prior to bacterial inoculation. Minimum inhibitory concentration (MIC) was determined by finding the lowest concentration of drug that did not have turbidity in the well. All fosfomycin antibiotic assays contained 25 mg/L glucose-6-phosphate (G6P).

The drugs were diluted 1:1 by serial diluting antibiotic with fresh media. One drug was serial diluted right to left in a 96 well plate, and the second drug was serially diluted top to bottom in a 96 well plate. Half of the final volume of the checkerboard plate was added from each of the two serial diluted drug plates to make the checkerboard plate. $5*10^5$ CFU was then inoculated, a breathe-easy strip was amended, and the plate was incubated at 37° C. for 20-24 hours. The checkerboard screen involved checkerboards of Mu208, Mu772, Mu308, Mu638, Mu1309, Mu1197, Mu827, and Mu1343 with the drugs ampicillin, tetracycline, meropenem, trimethoprim sulfamethoxazole, ciprofloxacin, cefepime, tobramycin, and fosfomycin. Using the clinical susceptibility testing designation via antibiograms for the 8 isolates, all R×R interactions were setup for these drugs to these 8 isolates. In total 86 synergy plates, 28 unique drug combinations, 1792 unique drug doses, and 5504 unique drug dose and bacterial combinations were performed using this method. MICs for each isolate and drug were determined the day of the checkerboard experiment to ensure similar drug concentrations for FIC determination. FIC was calculated as (FIC=(MIC DrugA with drugb/MIC DrugA alone) and (MIC drugB with drug a/MIC DrugB alone)), with the synergistic FIC≤0.5.

Cloning and mutagenesis. Mu208 ΔphoQ was generated by lambda red recombination. Briefly, a kanamycin cassette flanked by FRT sites with homology to the regions directly upstream and downstream, respectively, of the phoQ open reading frame (ORF) was inserted into the phoQ ORF in Mu208 with pKD46-tet, prior to it being removed with a flp recombinase encoded on the temperature sensitive plasmid, PCP20.

The invention claimed is:

1. A method of determining whether a bacteria culture is heteroresistant to antibiotics and treating a bacterial infection with a combination of heteroresistant antibiotics comprising:
   obtaining a sample from a subject diagnosed with a bacterial infection;
   growing bacteria from said sample providing a purified single bacterial colony;
   contacting a plurality of individual antibiotics with samples of the purified single bacterial colony providing individual contacted bacterial cultures for each antibiotic in the library;
   determining whether the individual contacted bacterial cultures for each antibiotic in the library is either,
   i) resistant to the antibiotic,
   ii) heteroresistant to the antibiotic, or
   iii) susceptible to the antibiotic; and
   administering to said subject in need of treatment an effective amount of a combination of heteroresistant antibiotics for treatment, wherein each antibiotic in the combination of antibiotics for treatment is determined from the individual contacted bacterial cultures to be heteroresistant to each antibiotic in said combination of heteroresistant antibiotics for treatment.

2. The method of claim 1, wherein none of the antibiotics for treatment are determined from the individual contacted bacterial cultures to be susceptible to an antibiotic in the library.

3. The method of claim 1, wherein the plurality of individual antibiotics comprises colistin, fosfomycin, ceftazidime, ampicillin, amikacin, gentamicin, tobramycin, aztreonam, cefazolin, cefepime, ciprofloxacin, meropenem, piperacillin, tazobactam, tetracycline, tigecycline, trimethoprim, and sulfamethoxazole.

4. The method of claim 1, wherein said subject is diagnosed with a carbapenem-resistant *Enterobacteriaceae* bacteria.

5. The method of claim 1, wherein said subject is diagnosed with Enterobacter species, Klebsiella species, or Escherichia species of bacteria.

6. The method of claim 1, wherein said subject is a transplant recipient, is being administered a chemotherapy regiment, or is a premature infant.

7. The method of claim 1, wherein said subject is diagnosed with bacteremia, surgical infections, or pneumonia.

* * * * *

SEQUENCE LISTING

<160> NUMBER OF SEQ ID NOS: 1

<210> SEQ ID NO 1
<211> LENGTH: 10
<212> TYPE: PRT
<213> ORGANISM: Artificial
<220> FEATURE:
<223> OTHER INFORMATION: Synthetic construct
<220> FEATURE:
<221> NAME/KEY: X

```
<222> LOCATION: (1)..(10)
<223> OTHER INFORMATION: For every X, X is 3-(amino)-4-(amino)butyric
      acid

<400> SEQUENCE: 1

Xaa Thr Xaa Xaa Xaa Leu Leu Xaa Xaa Thr
1               5                   10
```